United States Patent
Han et al.

(10) Patent No.: US 9,222,023 B2
(45) Date of Patent: Dec. 29, 2015

(54) LIQUID CRYSTAL COMPOSITION AND DISPLAY DEVICE THEREOF

(71) Applicant: JIANGSU HECHENG DISPLAY TECHNOLOGY CO., LTD., Jiangsu (CN)

(72) Inventors: Wenming Han, Jiangsu (CN); Yudong Tan, Jiangsu (CN); Dingfu Ma, Jiangsu (CN); Biao Hu, Jiangsu (CN); Yiming Wang, Jiangsu (CN); Zhaoyuan Chen, Jiangsu (CN); Shizhi You, Jiangsu (CN)

(73) Assignee: Jiangsu Hecheng Display Technology Co., Ltd., Jiangsu (CN)

( * ) Notice: Subject to any disclaimer, the term of this patent is extended or adjusted under 35 U.S.C. 154(b) by 0 days.

(21) Appl. No.: 14/394,330

(22) PCT Filed: Apr. 10, 2013

(86) PCT No.: PCT/CN2013/000409
§ 371 (c)(1),
(2) Date: Oct. 14, 2014

(87) PCT Pub. No.: WO2013/152622
PCT Pub. Date: Oct. 17, 2013

(65) Prior Publication Data
US 2015/0076405 A1 Mar. 19, 2015

(30) Foreign Application Priority Data
Apr. 12, 2012 (CN) ............ 2012 1 0106192

(51) Int. Cl.
C09K 9/00 (2006.01)
C09K 19/32 (2006.01)
C09K 19/04 (2006.01)

(52) U.S. Cl.
CPC ......... *C09K 19/32* (2013.01); *C09K 2019/0466* (2013.01)

(58) Field of Classification Search
CPC ...................................................... C09K 19/18
USPC ..................................................... 252/299.62
See application file for complete search history.

(56) References Cited

U.S. PATENT DOCUMENTS

| 5,385,692 | A | 1/1995 | Iwaki et al. |
| 5,910,271 | A | 6/1999 | Ohe et al. |
| 5,993,691 | A | 11/1999 | Pausch et al. |
| 6,011,606 | A | 1/2000 | Ohe et al. |
| 6,146,720 | A | 11/2000 | Pausch et al. |
| 7,553,522 | B2 | 6/2009 | Heckmeier et al. |

(Continued)

FOREIGN PATENT DOCUMENTS

| CA | 2082617 A1 | 5/1993 |
| CN | 1869792 A | 11/2006 |

(Continued)

*Primary Examiner* — Chanceity Robinson
(74) *Attorney, Agent, or Firm* — Laurence Greenberg; Werner Stemer; Ralph Locher

(57) ABSTRACT

A liquid crystal composition and a liquid crystal display wherein the liquid crystal composition includes: a compound of general formula (I) including 1%-50% of the total weight of the liquid crystal composition; a compound of general formula (II) including 1%-60% of the total weight of the liquid crystal composition; a compound of general formula (III) including 1%-60% of the total weight of the liquid crystal composition; and a compound of general formula (IV) including 0-50% of the total weight of the liquid crystal composition—wherein the liquid crystal composition has a suitably wider nematic phase scope, a suitable optical anisotropy, a favorable low-temperature storage stability a faster response speed, can be used for outdoor work, has a good image display effect, and substantially free of streaking phenomenon.

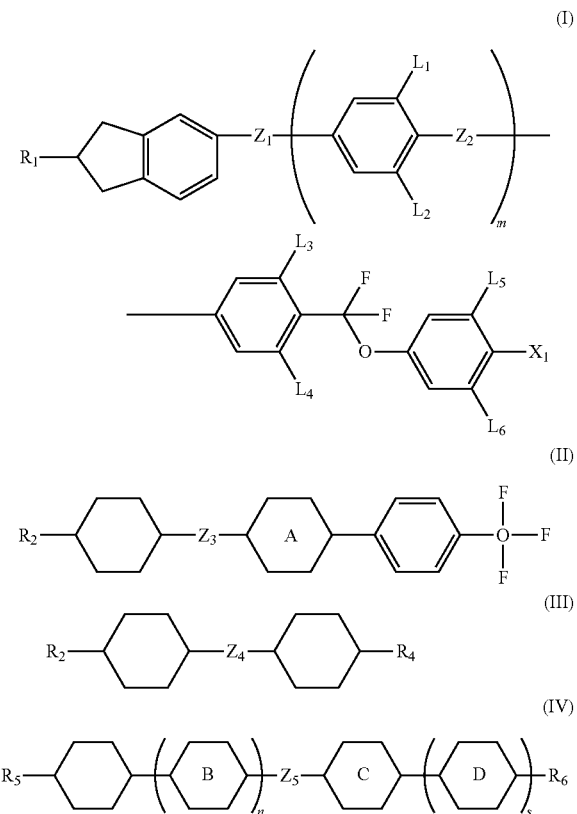

10 Claims, No Drawings

(56) References Cited

U.S. PATENT DOCUMENTS 7,579,053 B2  8/2009  Czanta et al.
2014/0191158 A1  7/2014  Wu et al.

FOREIGN PATENT DOCUMENTS

| | | |
|---|---|---|
| CN | 1908117 A | 2/2007 |
| CN | 101372619 A | 2/2009 |
| CN | 102337139 A | 2/2012 |
| CN | 102634346 A | 8/2012 |
| CN | 102660297 A | 9/2012 |
| DE | 19528106 A1 | 8/1996 |
| DE | 19528107 A1 | 9/1996 |
| EP | 0667555 A1 | 8/1995 |
| EP | 0673986 A2 | 9/1995 |
| JP | S5679647 A | 6/1981 |
| JP | 09104867 A | 4/1997 |

LIQUID CRYSTAL COMPOSITION AND DISPLAY DEVICE THEREOF

TECHNICAL FIELD

The present invention relates to a liquid crystal composition, and specifically relates to a liquid crystal composition having a higher response speed, a broader range of a nematic phase and a favourable low-temperature storage stability and the use thereof.

BACKGROUND ARTS

Liquid crystal material is a mixture of organic rod-shaped small molecular compounds which has both liquid fluidity and anisotropy of crystal in a certain temperature. Because of its optical anisotropy and dielectric anisotropy characteristics, liquid crystal material is widely used in the liquid crystal display elements of the devices of electronic calculators, car dashboard, televisions, computers and the like. Based on the LCD modes, liquid crystal compositions can be classified into the types of twisted nematic (TN), super twisted nematic (STN), thin film transistor (TFT), guest-host (GH), dynamic scattering (DS) and the like. The most common display element therein is based on the Schadt-Helfrich effect and has a twisted nematic structure.

Liquid crystal materials are required to have good chemical and heat stability, a suitable optical anisotropy, a broader range of a nematic phase as well as the good stabilities to electric field and electromagnetic radiation. In addition, the liquid crystal materials should have low viscosity and produce low threshold voltage and high contrast ratio in the liquid crystal cell. Since liquid crystal material is normally used as a mixture of various components, it is especially important that these components are miscible with each other. However, as the optimization of each performance parameter of the mixed liquid crystal material may result in inter-contradictory, inter-constraint and inter-influence results, it is very difficult to achieve a broader range of a nematic phase, suitable refractivity and dielectric anisotropy, as well as low-temperature storage stability at the same time. For example, the obvious defects of the liquid crystal compositions of EP0667555, EP0673986, DE19528106, DE19528107 and WO962851 are having a longer response time, lower resistivity and overhigh operating voltage. Further, poor low-temperature storage stability is also a defect of various existing liquid crystal materials.

Therefore, in the field of liquid crystal material, there is a need for novel liquid crystal compositions with improved performances. Particularly, for many types of application, liquid crystal compositions should have a suitably broader range of a nematic phase, a suitable refractivity and dielectric anisotropy, and a low-temperature storage stability.

SUMMARY OF THE INVENTION

One object of the present invention is to provide a liquid crystal composition having a higher response speed, a broader range of a nematic phase and a favourable low-temperature storage stability through optimizing the combinations of various liquid crystal compositions and the formulations thereof. The liquid crystal compositions will not show the defects in the existing materials or at least only show the above defects in a significantly lower degree.

In order to achieve the aforementioned object of the invention, the present invention provides a liquid crystal composition which comprises four compounds conforming with the following structural general formulas I, II, III and IV, wherein:

(1) 1%-50% by weight of the total amount of the liquid crystal composition of a compound of general formula (I)

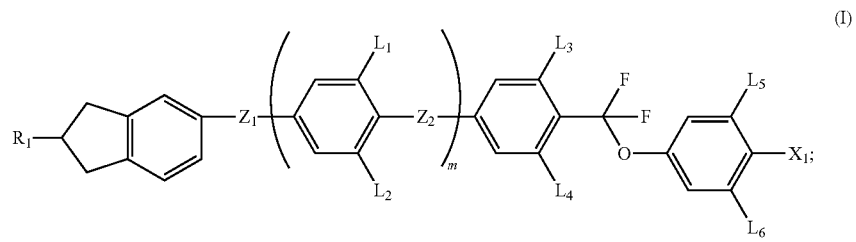

(2) 1%-60% by weight of the total amount of the liquid crystal composition of a compound of general formula (II)

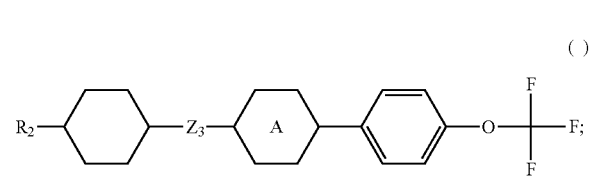

(3) 1%-60% by weight of the total amount of the liquid crystal composition of a compound of general formula (III)

and (4) 0%-50% by weight of the total amount of the liquid crystal composition of a compound of general formula (IV)

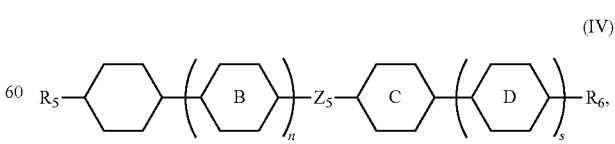

in which:
$R_1$, $R_2$, $R_3$, $R_4$, $R_5$ and $R_6$ can be same or different, and are independently selected from a group consisting of H, halogen, $C_1$-$C_7$ alkyl, $C_1$-$C_7$ alkoxy, $C_2$-$C_7$ alkenyl and $C_2$-$C_7$ alkenoxy, in which one or more H of the $C_1$-$C_7$ alkyl, $C_1$-$C_7$ alkoxy, $C_2$-$C_7$ alkenyl and $C_2$-$C_7$ alkenoxy can be independently substituted by F;

$Z_1$-$Z_5$ can be same or different, and are independently selected from a group consisting of single bond, —CH=CH—, —C≡C—, —O—, —COO—, —COO—, —OCH$_2$—, —C$_2$H$_4$—, —CH$_2$O— and —CF$_2$O—;

$X_1$ is selected from a group consisting of halogen, $C_1$-$C_7$ alkyl, $C_1$-$C_7$ alkoxy and $C_2$-$C_7$ alkenoxy, in which one or more H of the $C_1$-$C_7$ alkyl, $C_1$-$C_7$ alkoxy and $C_2$-$C_7$ alkenoxy can be independently substituted by F;

$L_1$-$L_6$ can be same or different, and independently are H or F, in which, at lease two of the $L_1$-$L_6$ are F;

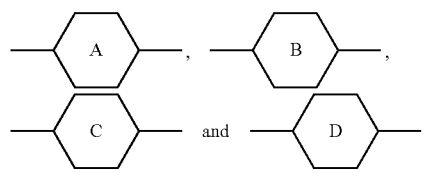

are independently selected from a group consisting of

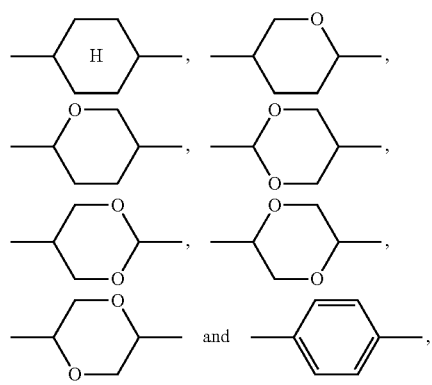

in which, one or more H of the

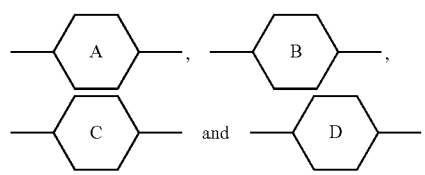

can be independently substituted by F;

m, n and s independently are 0 or 1, and n and s are not simultaneously 0.

In the embodiments of the present invention, preferably, the compound of general formula (I) accounts for 3%-45% by weight of the total amount of the liquid crystal composition; the compound of general formula (II) accounts for 2%-50% by weight of the total amount of the liquid crystal composition; the compound of general formula (III) accounts for 3%-45% by weight of the total amount of the liquid crystal composition; and the compound of general formula (IV) accounts for 5%-40% by weight of the total amount of the liquid crystal composition.

In the embodiments of the present invention, preferably, the compound of general formula (I) is one or more compounds selected from a group consisting of the following compounds:

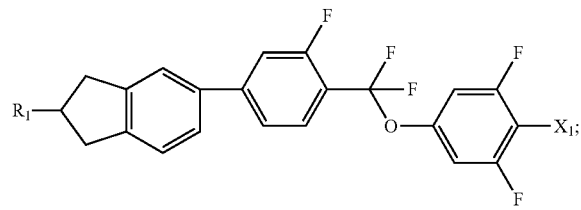
I-1

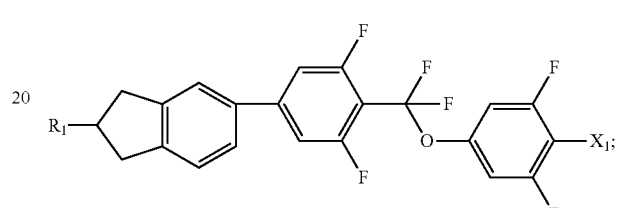
I-2

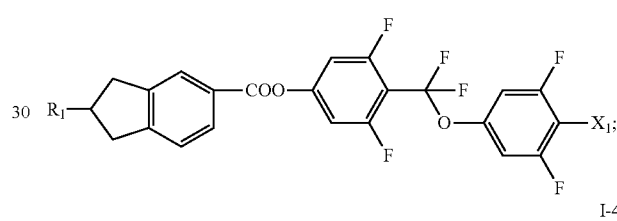
I-3

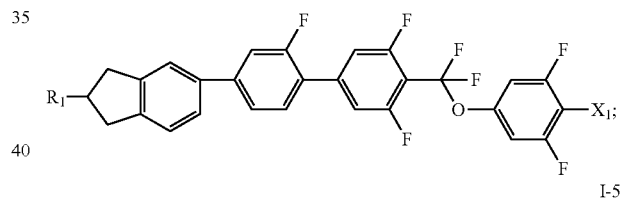
I-4

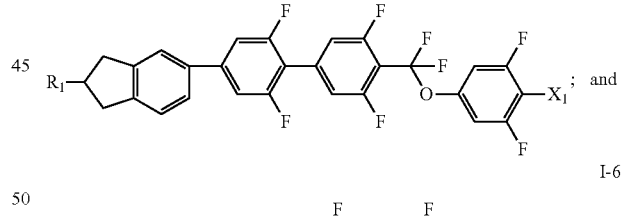
I-5

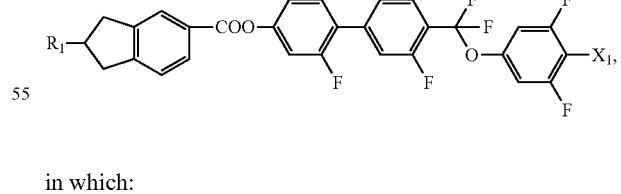
I-6 in which:

$R_1$ is selected from a group consisting of $C_1$-$C_5$ alkyl, $C_1$-$C_5$ alkoxy, $C_2$-$C_5$ alkenyl and $C_2$-$C_5$ alkenoxy, in which one or more H of the $C_1$-$C_5$ alkyl, $C_1$-$C_5$ alkoxy, $C_2$-$C_5$ alkenyl and $C_2$-$C_5$ alkenoxy can be independently substituted by F;

$X_1$ is selected from a group consisting of —F, —Cl, —CH$_2$F, —CH$_2$CH$_2$F, —CH$_2$CH$_2$CH$_2$F, —CH$_2$CH$_2$CH$_2$CH$_2$F, —OCF$_3$, —OCH$_2$F, —CH$_2$OCH$_2$F, —CH$_2$CH$_2$OCH$_2$F, —CH=CH$_2$ and —OCH=CF$_2$.

In the embodiments of the present invention, preferably, the compound of general formula (II) is one or more compounds selected from a group consisting of the following compounds:

II-1
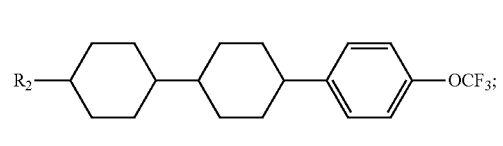

II-2
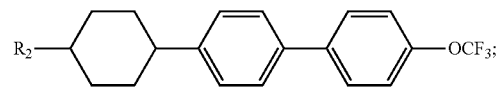

II-3
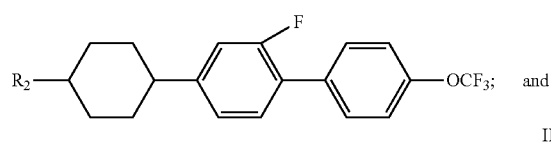 and

II-4
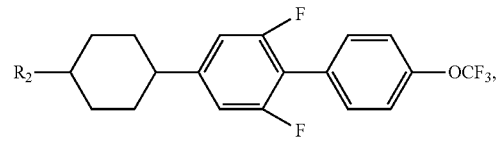

in which:

$R_2$ is selected from a group consisting of $C_1$-$C_5$ alkyl, $C_1$-$C_5$ alkoxy, $C_2$-$C_5$ alkenyl and $C_2$-$C_5$ alkenoxy, in which one or more H of the $C_1$-$C_5$ alkyl, $C_1$-$C_5$ alkoxy, $C_2$-$C_5$ alkenyl and $C_2$-$C_5$ alkenoxy can be independently substituted by F.

In the embodiments of the present invention, preferably, the compound of general formula (III) is one or more compounds selected from a group consisting of the following compounds:

III-1
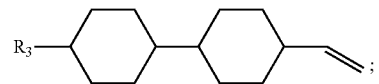

III-2
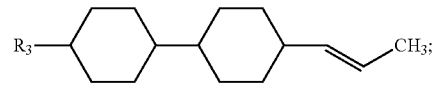

III-3
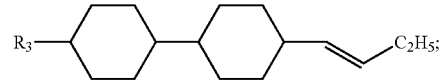

III-4
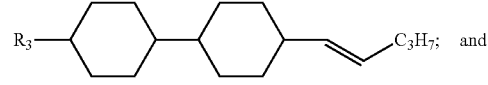 and

III-5
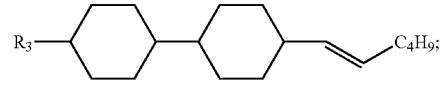

in which:

$R_3$ is selected from a group consisting of $C_1$-$C_5$ alkyl, $C_1$-$C_5$ alkoxy, $C_2$-$C_5$ alkenyl and $C_2$-$C_5$ alkenoxy, in which one or more H of the $C_1$-$C_5$ alkyl, $C_1$-$C_5$ alkoxy, $C_2$-$C_5$ alkenyl and $C_2$-$C_5$ alkenoxy can be independently substituted by F.

In the embodiments of the present invention, preferably, the compound of general formula (IV) is one or more compounds selected from a group consisting of the following compounds:

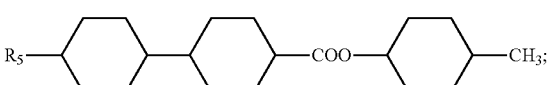

IV-1
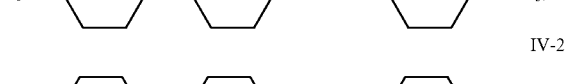

IV-2
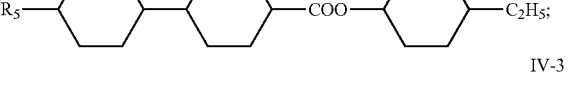

IV-3
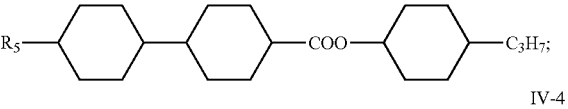

IV-4
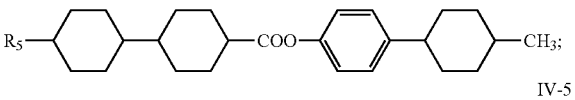

IV-5
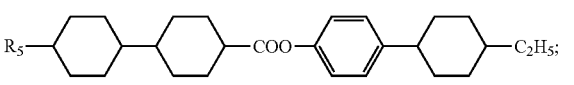

IV-6
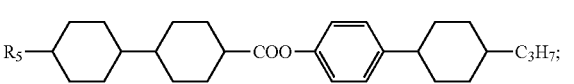

IV-7
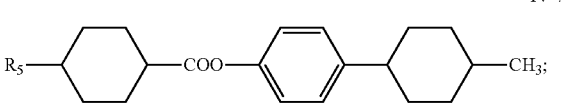

IV-8
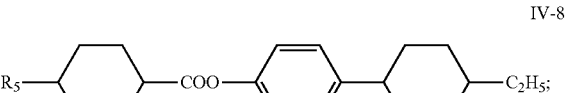

IV-9
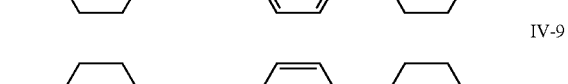

IV-10
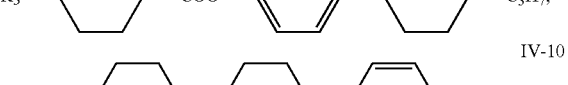

IV-11
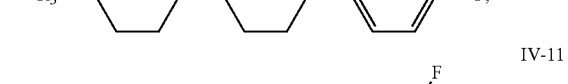

IV-12
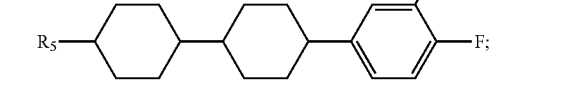

IV-13
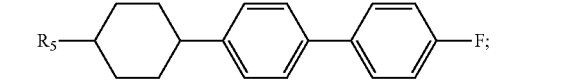

-continued

IV-14

IV-15
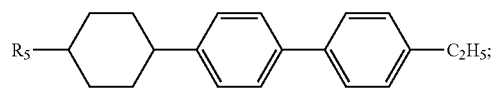

IV-16

IV-17
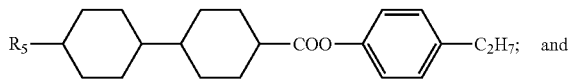 and

-continued

IV-18
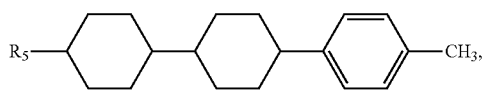

in which:

$R_5$ is selected from a group consisting of $C_1$-$C_5$ alkyl, $C_1$-$C_5$ alkoxy, $C_2$-$C_5$ alkenyl and $C_2$-$C_5$ alkenoxy, in which one or more H of the $C_1$-$C_5$ alkyl, $C_1$-$C_5$ alkoxy, $C_2$-$C_5$ alkenyl and $C_2$-$C_5$ alkenoxy can be independently substituted by F.

More preferably, the compound of general formula (I) is one or more compounds selected from a group consisting of the following compounds:

I-1-1
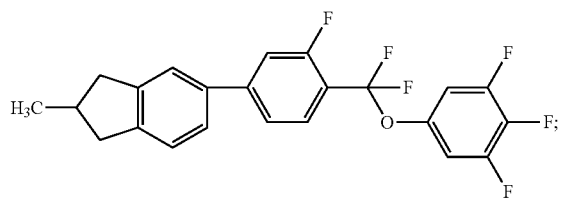

I-1-2
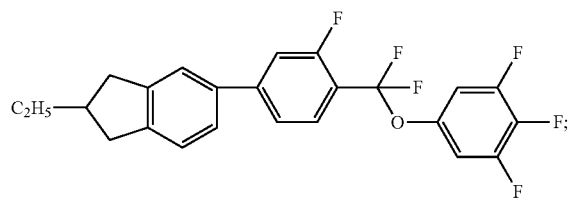

I-1-3
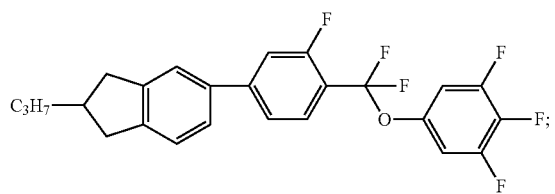

I-1-4
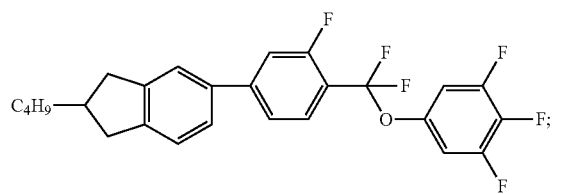

I-1-5
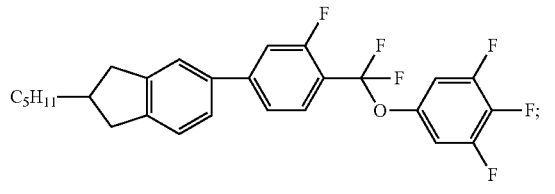

I-1-6
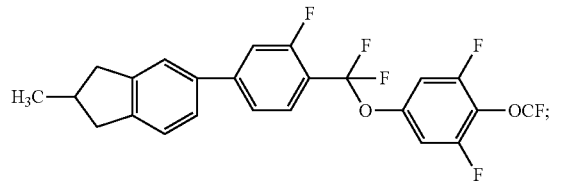

I-1-7
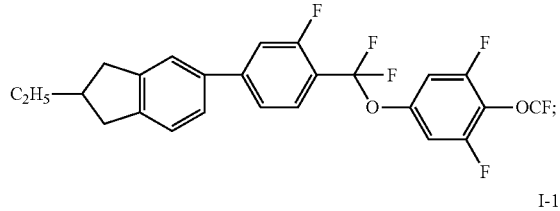

I-1-8
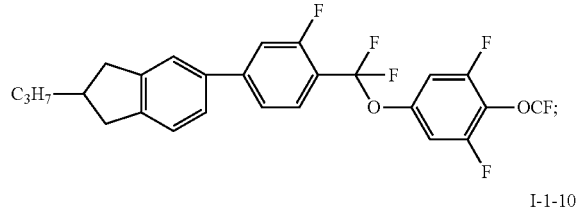

I-1-9
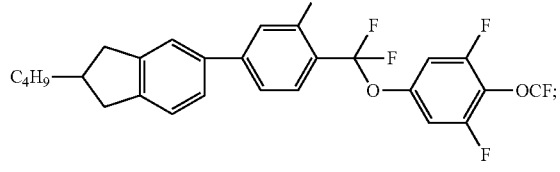

I-1-10
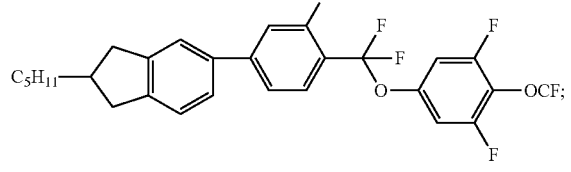

-continued
I-1-11
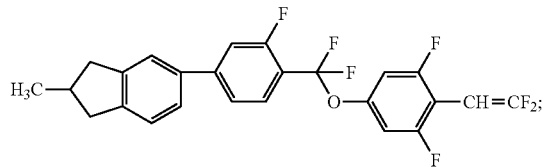
I-1-12
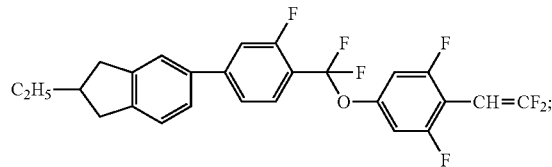
I-1-13
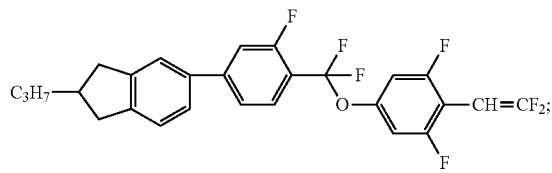
I-1-14
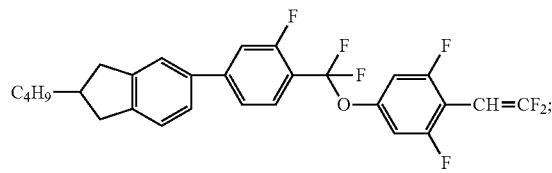
I-1-15
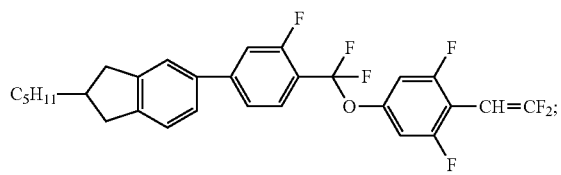
I-2-1
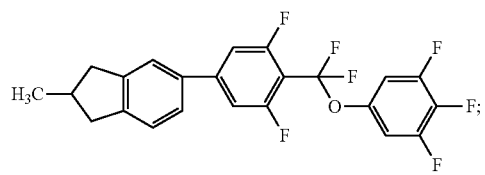
I-2-2
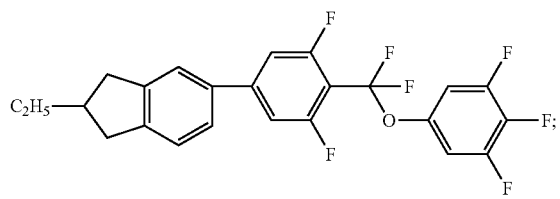
I-2-3
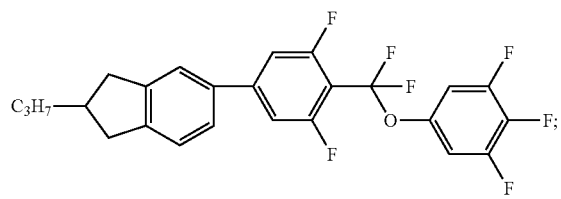
I-2-4
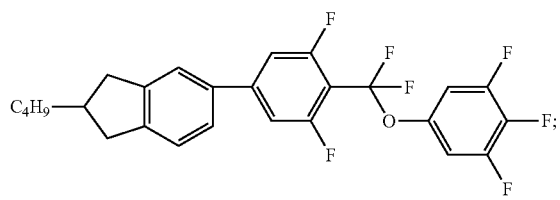
I-2-5
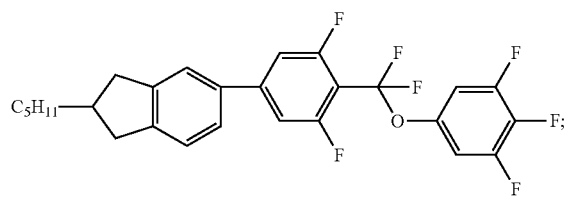
I-2-6
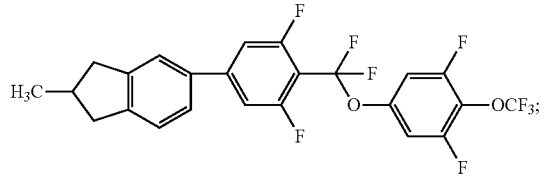
I-2-7
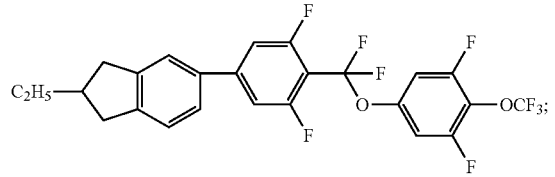
I-2-8
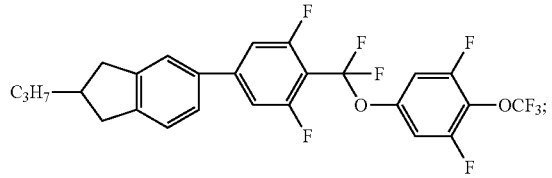
I-2-9
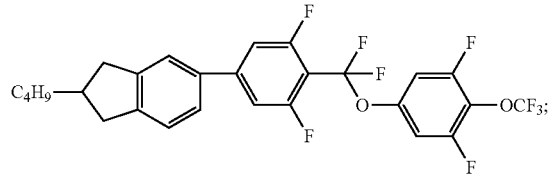

-continued
1-2-10
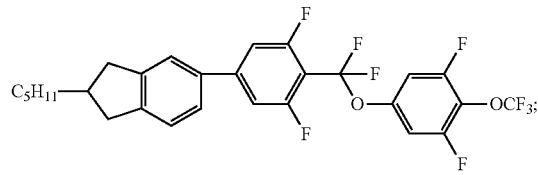
1-2-11
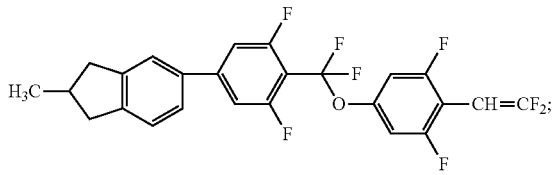
1-2-12
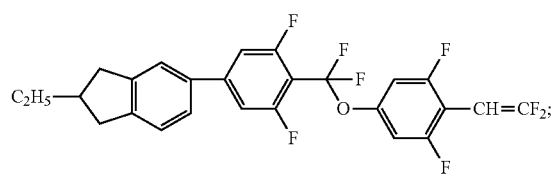
1-2-13
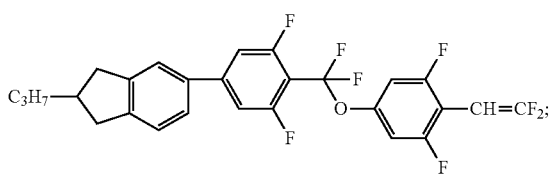
1-2-14
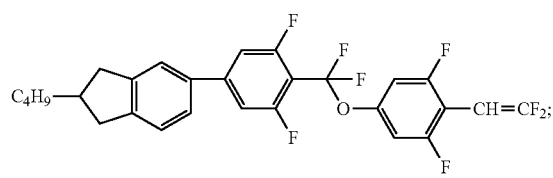
1-2-15
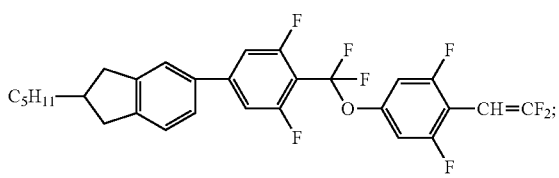
I-3-1
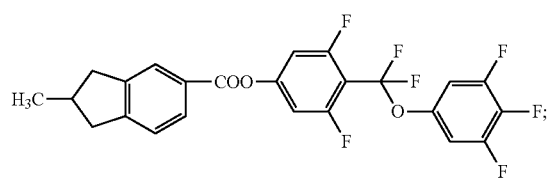
I-3-2
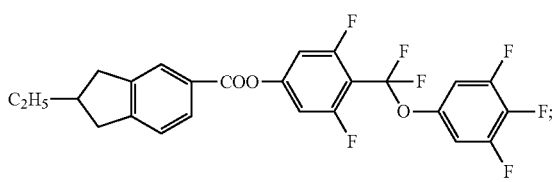
I-3-3
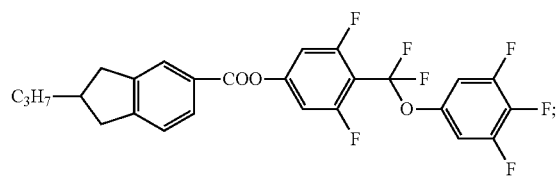
I-3-4
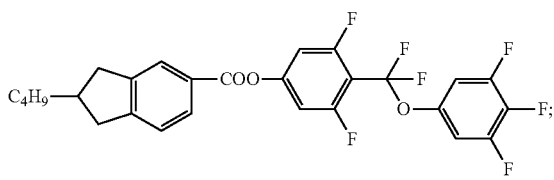
I-3-5
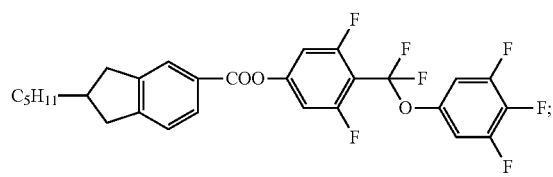
I-3-6
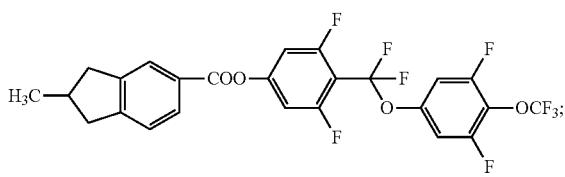
I-3-7
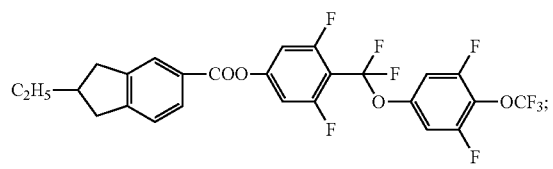
I-3-8
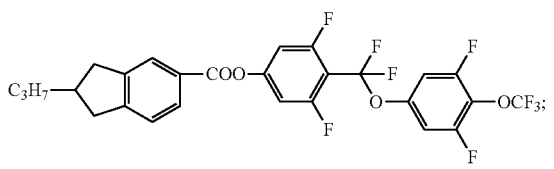
I-3-9
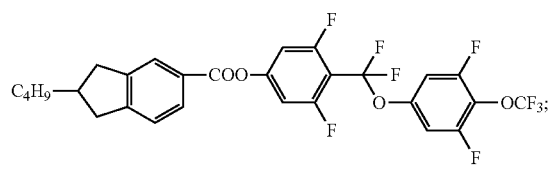
I-3-10
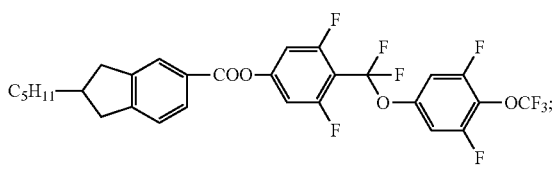

-continued

-continued
I-4-11
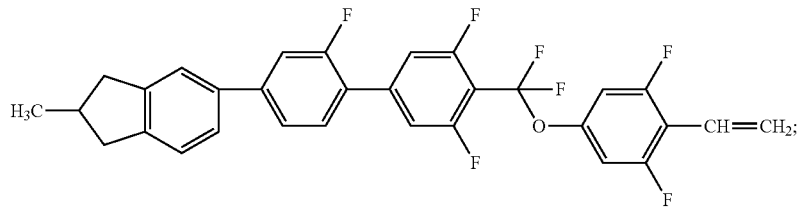
I-4-12
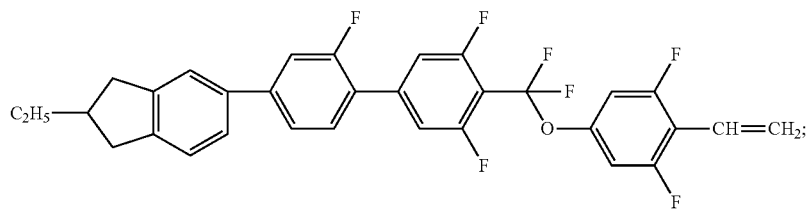
I-4-13
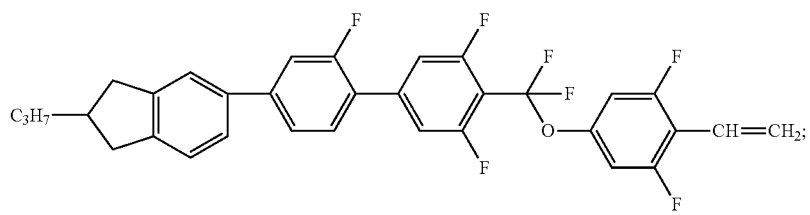
I-4-14
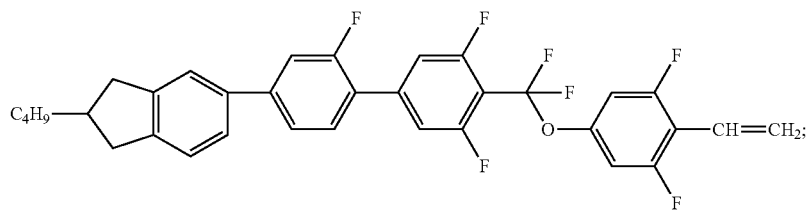
I-4-15
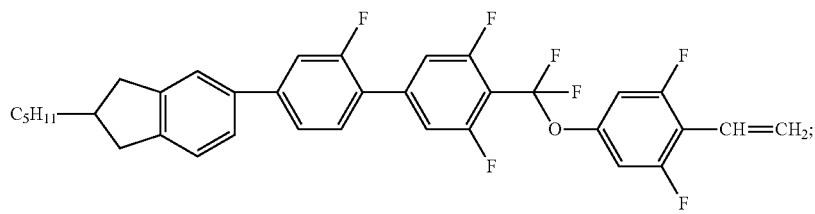
I-5-1
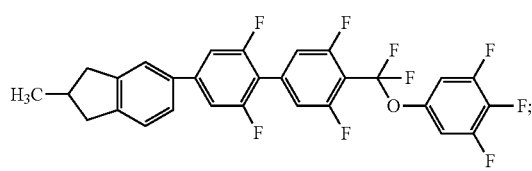
I-5-2
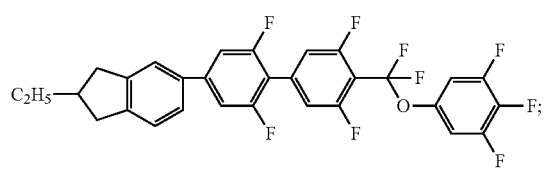
I-5-3
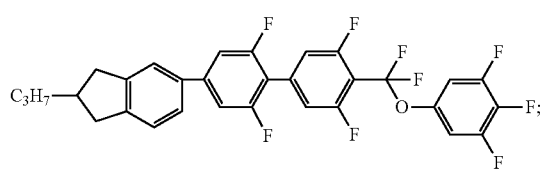
I-5-4
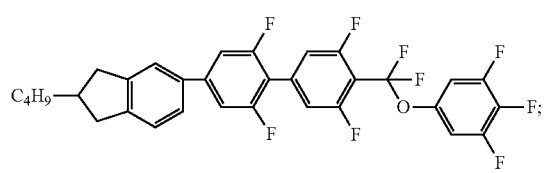

-continued
I-5-5
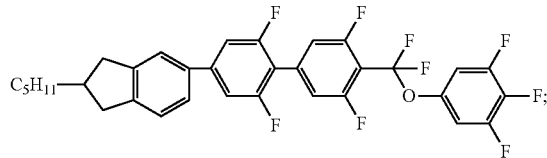
I-5-6
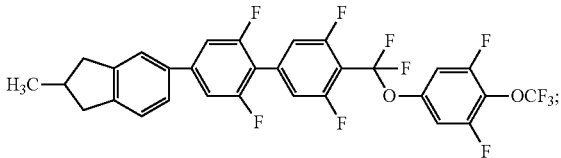
I-5-7
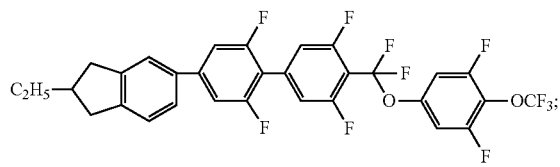
I-5-8
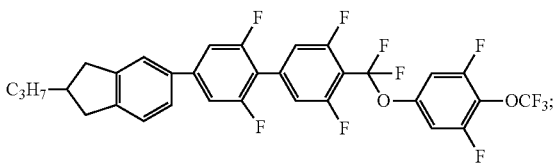
I-5-9
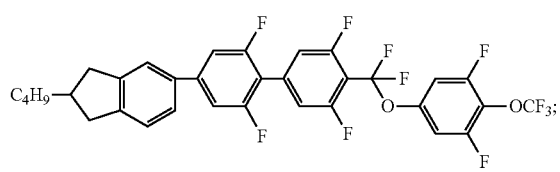
I-5-10
I-5-11
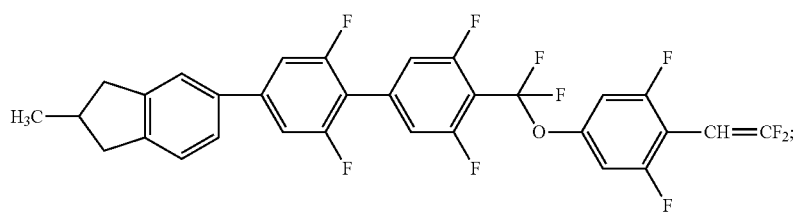
I-5-12
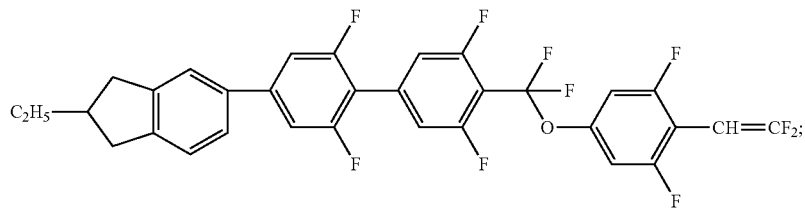
I-5-13
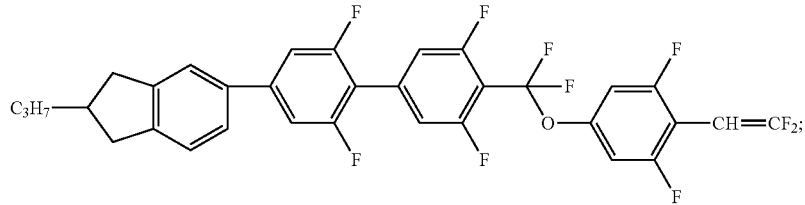
I-5-14
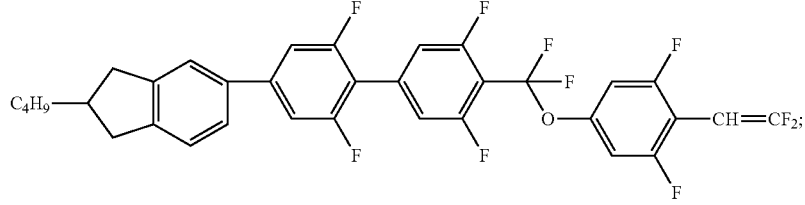

-continued
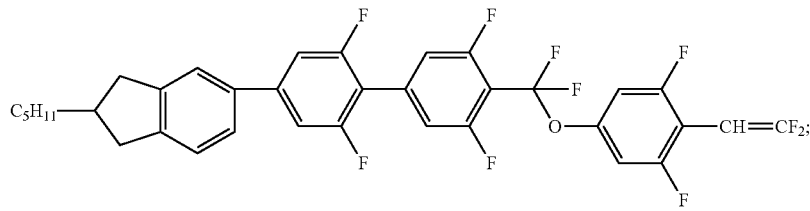
I-5-15
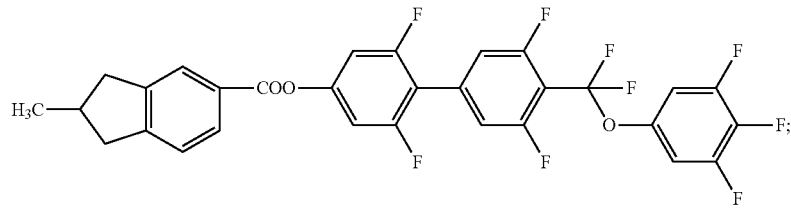
I-6-1
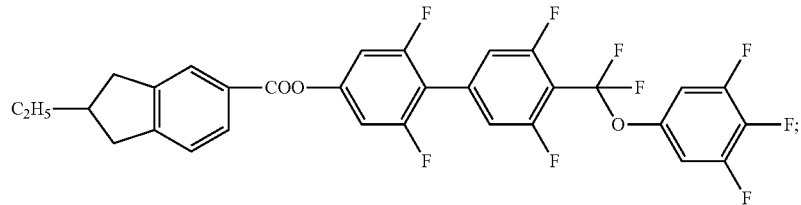
I-6-2
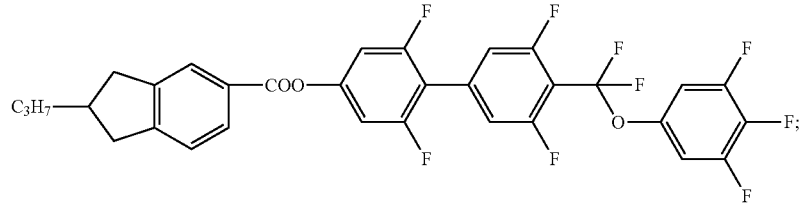
I-6-3
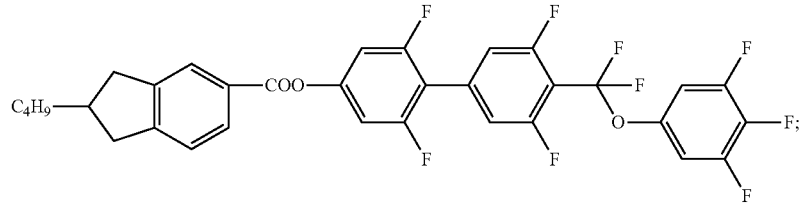
I-6-4
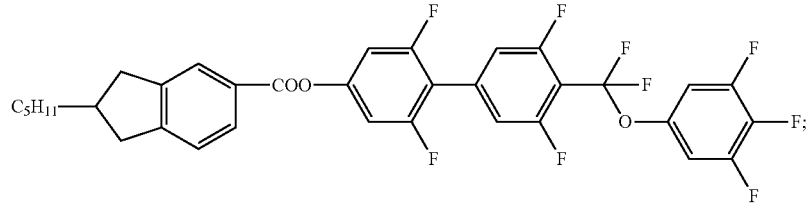
I-6-5
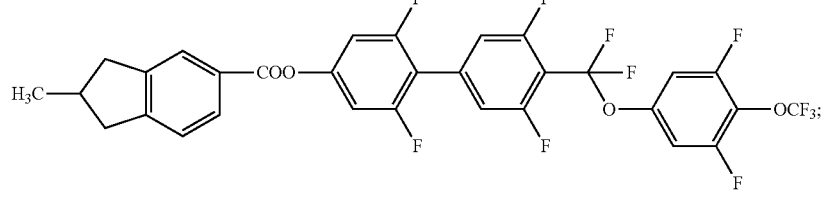
I-6-6

-continued
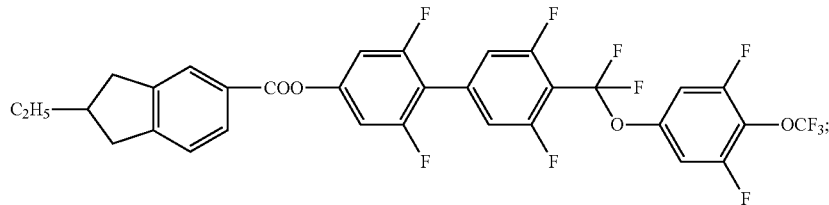
I-6-7
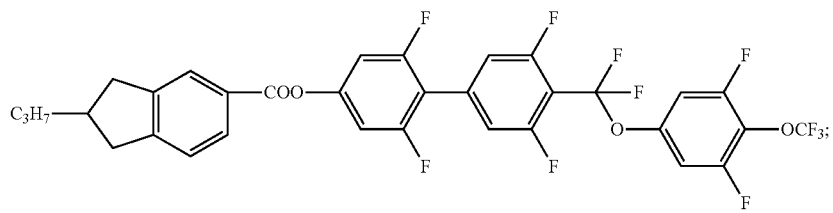
I-6-8
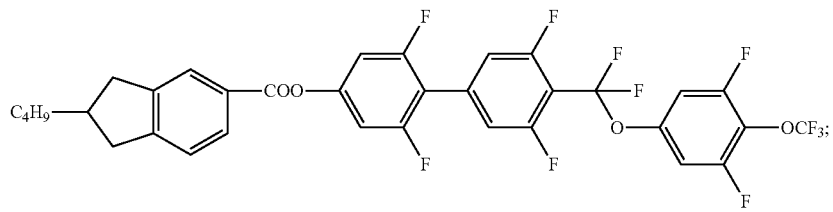
I-6-9
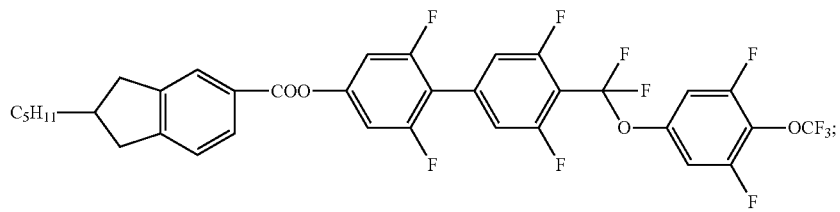
I-6-10
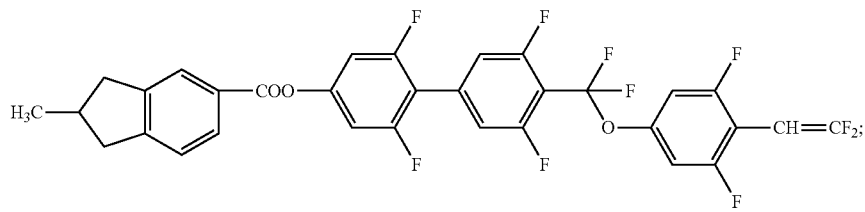
I-6-11
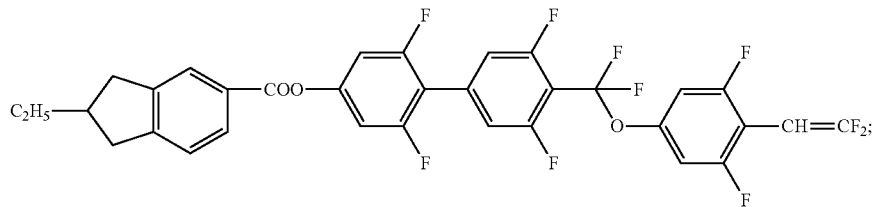
I-6-12
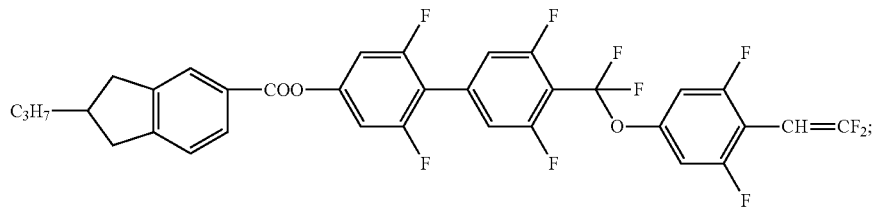
I-6-13

I-6-14
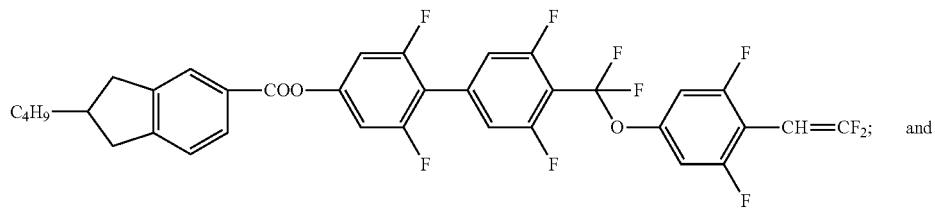
I-6-15
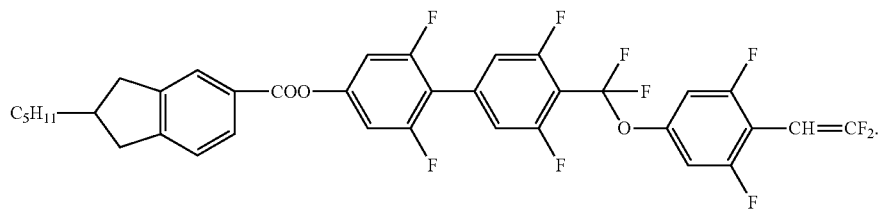
More preferably, the compound of general formula (II) is one or more compounds selected from a group consisting of the following compounds:
II-1-1
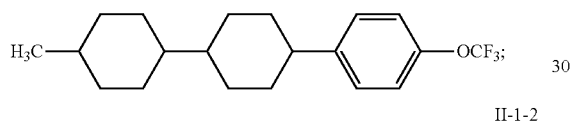
II-1-2
II-1-3
II-1-4
II-1-5
II-2-1
II-2-2
II-2-3
II-2-4
II-2-5
II-3-1
II-3-2
II-3-3
II-3-4
II-3-5

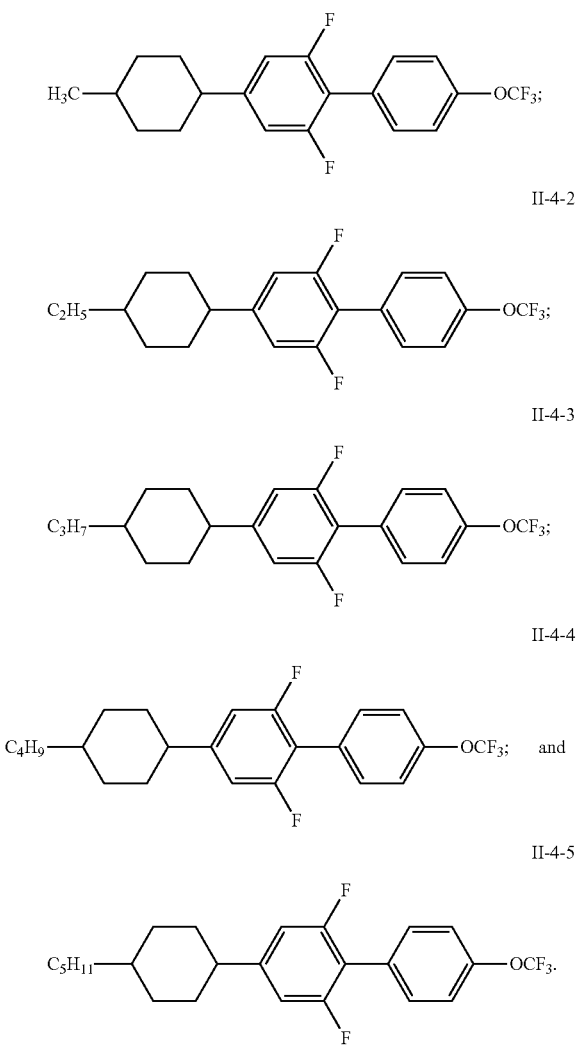
More preferably, the compound of general formula (III) is one or more compounds selected from a group consisting of the following compounds:
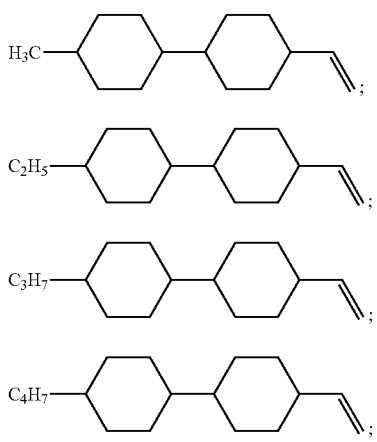
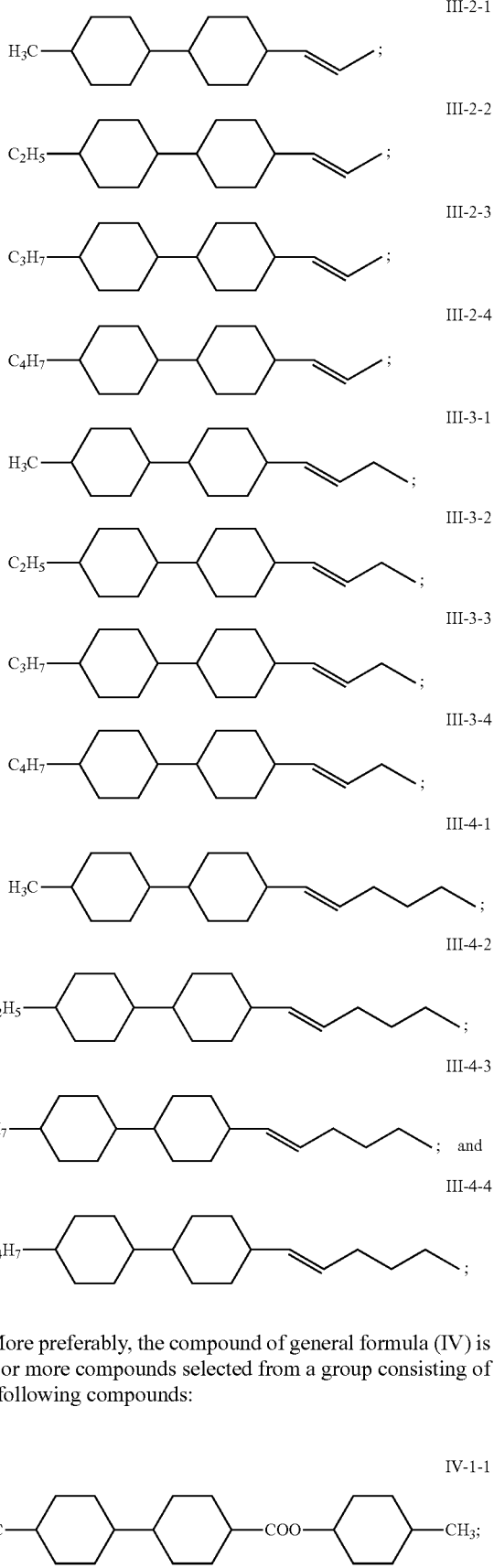
More preferably, the compound of general formula (IV) is one or more compounds selected from a group consisting of the following compounds:

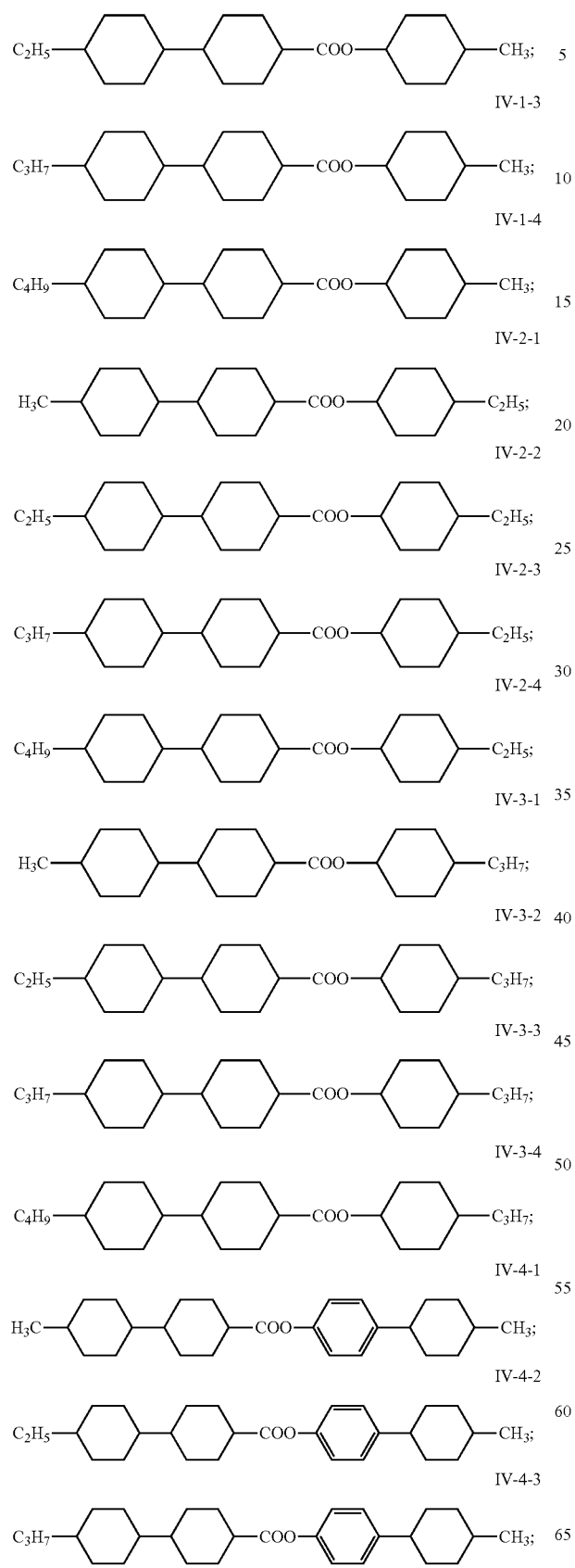

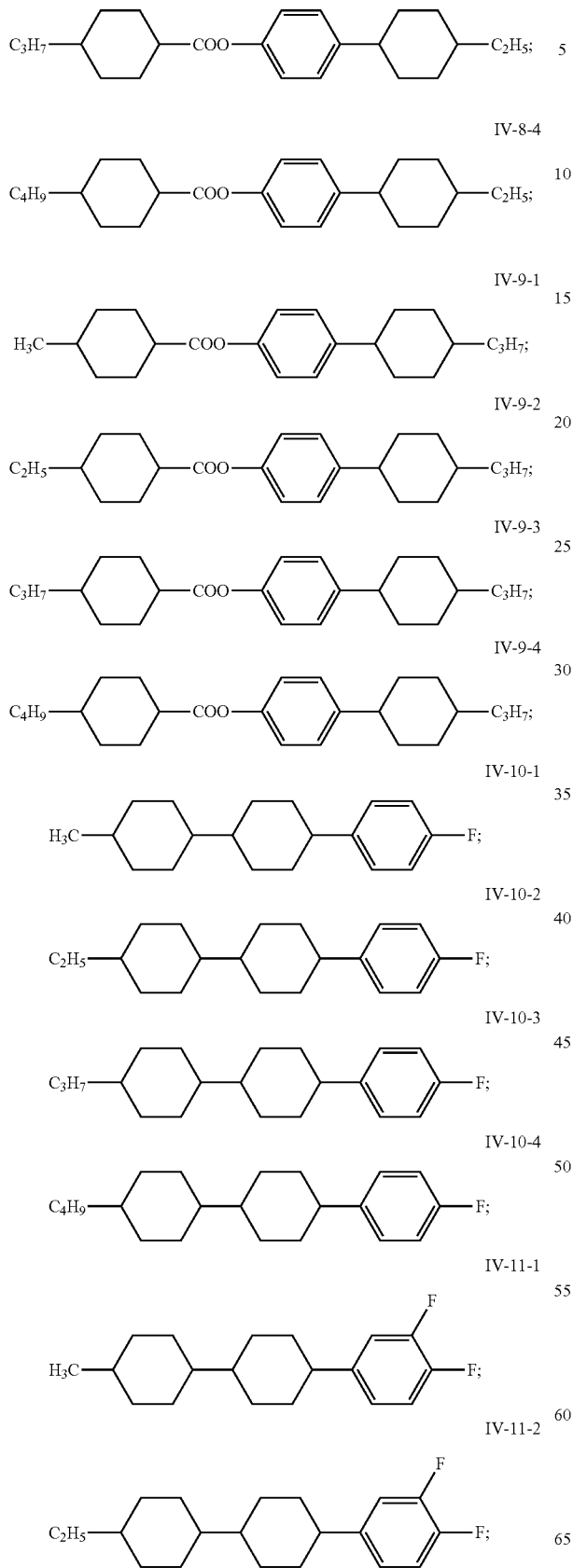
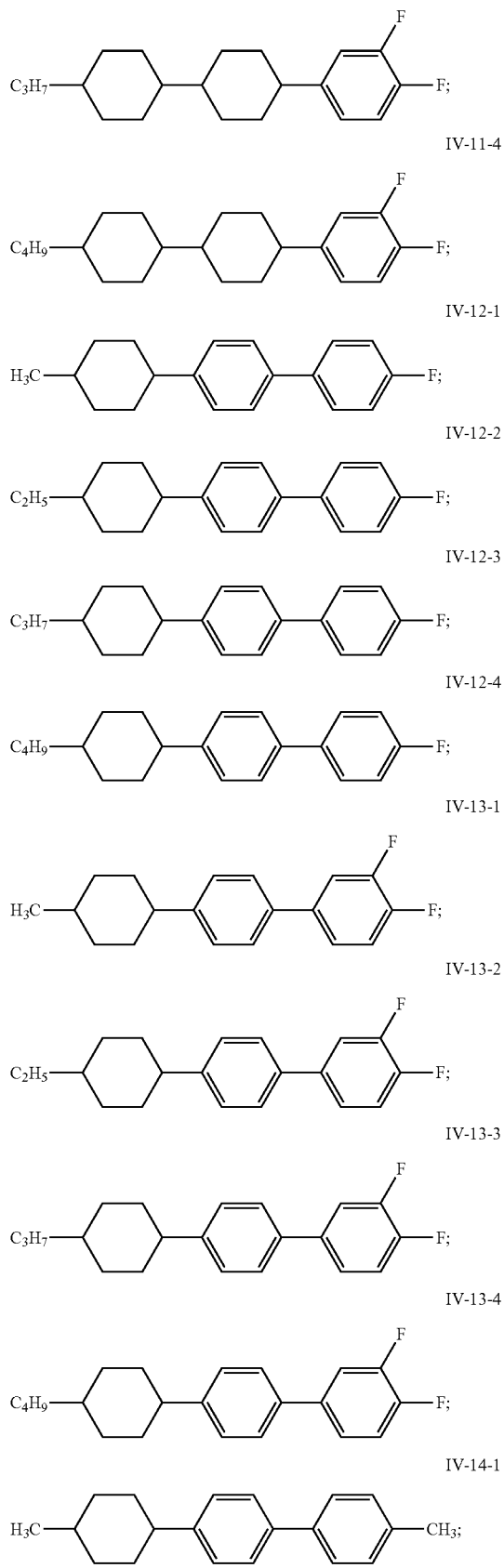

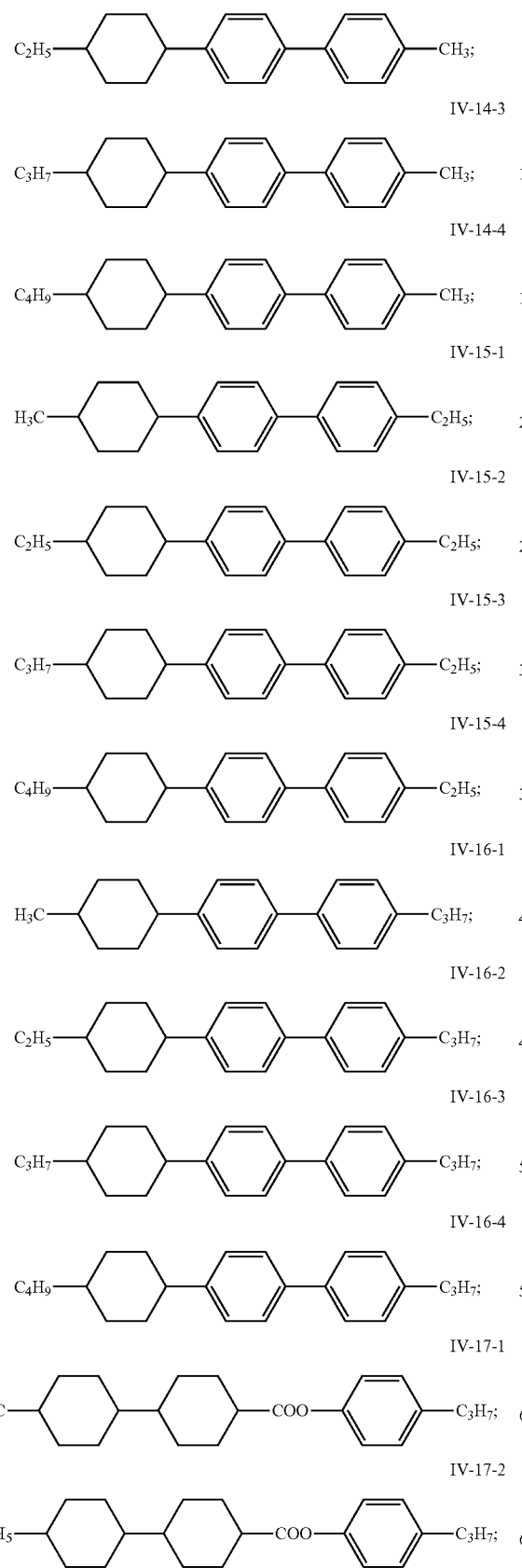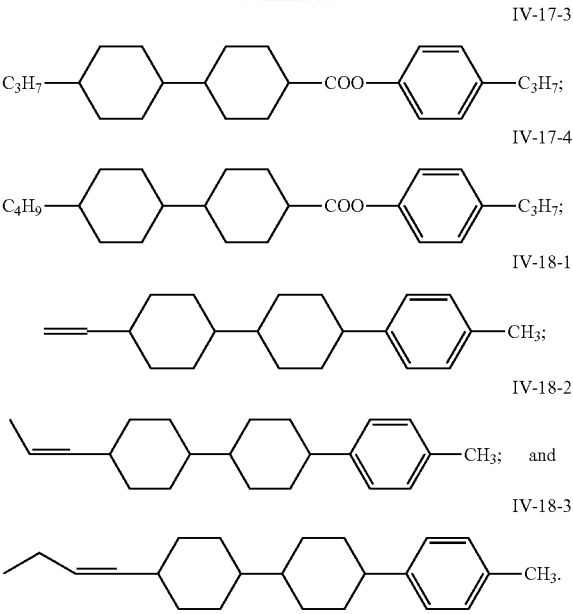

In another aspect of the present invention, it provides a use of the liquid crystal composition of the present invention in manufacturing electrooptic device.

In yet another aspect of the present invention, it provides an electrooptic liquid crystal display comprising the liquid crystal composition of the present invention.

A liquid crystal medium comprising the aforementioned liquid crystal compositions with a broader range of nematic phase, a suitable optical anisotropy, a favourable low-temperature storage stability and a faster response time was established by the inventors through doing the combined experiments for the above compounds and comparing with the Comparison Examples.

As stated above, the liquid crystal compositions of the present invention can be used for outdoor work. The image display effect thereof is good, and there is no smearing phenomenon. Moreover, the liquid crystal compositions of the present invention have a favourable low-temperature storage stability and a higher response speed.

Unless specifically indicated, in the present invention, all ratios are weight ratios; all temperatures are degree centigrade; and the test on the data of the response time uses a cell gap of 7 nm.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

The liquid crystal displays employed in the following embodiments are all TN-TFT liquid crystal display apparatus which is comprised of elements, such as polarizers (polaroids), electrode substrates, etc., and the cell gap thereof d=7 μm. This display apparatus is in normally white (NW) mode, i.e., white pixel color is observed if there is no voltage difference applied between the row electrode and the column electrode. The axes of the upper and lower polaroids on the substrates are at a 90-degree angle. The optical liquid crystal material is filled full of the space between the two substrates.

For the convenience of the expression, the unit structures of the liquid crystal compounds in the following Examples are represented by the codes listed in Table 1:

TABLE 1

The codes of the unit structures of the liquid crystal compounds

| Unit structure | Code | Name of the group |
|---|---|---|
| | C | 1,4-cyclohexylidene |
| | P | 1,4-phenylene |
| | I | indane-2,5-diyl |
| | G | 2-fluoro-1,4-phenylene |
| | U | 2,5-difluoro-1,4-phenylene |
| | Q | difluoro-substituted ether group |
| —O— | O | oxy |
| —F | F | fluorine |
| —CH=CH— | V | alkenyl |
| —C≡C— | T | alkynyl |
| —COO— | E | ester bridge bond |
| —$C_nH_{2n+1}$ or —$C_mH_{2m+1}$ | N or m | alkyl |

Take the following structural formula as an example:

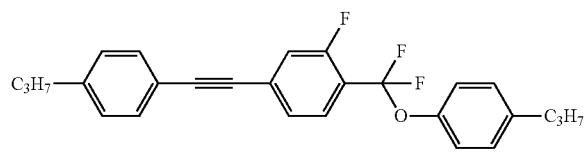

Represented by the codes listed in Table 1, this structural formula can be expressed as 3PTGQP3.

Another example:

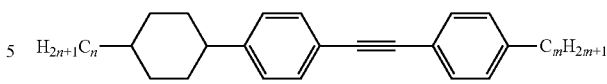

it can be expressed as nCPTPm, in which, the n in the code represents the number of the carbon atoms of the alkyl group on the left, for example, n is "3" means the alkyl is —$C_3H_7$; the C in the code represents a cyclohexyl; the P in the code represents phenylene; the T in the code represents alkynyl; the m in the code represents the number of the carbon atoms of the alkyl group on the right, for example, m is "1" means the right alkyl is —$CH_3$.

The abbreviated codes of the test items in the following Examples are respectively represented as:

Cp ( ) clearing point (nematic-isotropy phase transition temperature)

Δn optical anisotropy (589 nm, 20° C.)

γ1 torque viscosity (mPa*s, below 20° C.)

K11 elastic constant ("splay", pN below 20° C.)

K33 elastic constant ("bend", pN below 20° C.)

$t_{-30°\ C.}$ storage lifetime at low-temperature (below −30° C.)

V90 saturation voltage=characteristic voltage at 90% relative contrast (NW mode)

V10 threshold voltage=characteristic voltage at 10% relative contrast (NW mode)

Test conditions of V10: C/1 KHZ, JTSB7.0.

The ingredients used in the following Examples are all synthesized by the inventors of the present application according to the methods known in the art. These synthetic techniques are routine, and the test results show that the liquid crystal compounds thus prepared meet the criteria for the electronic compounds.

Several liquid crystal compositions are prepared according to the formulations of the liquid crystal compositions specified in the following Examples. The preparation of the liquid crystal compositions is proceeded according to the conventional methods in the art, and as an example, the compositions are prepared by mixing the specified formulation via the processing modes, such as heating, ultrasonic processing, suspending processing and so on.

The liquid crystal composition specified in the following Examples are prepared and studied. The formulas of the liquid crystal compositions and their test results for the performance are shown below.

Table 2 and Table 5 show the formulations of the liquid crystal compositions of the Comparison Examples. The test results obtained from the liquid crystal display devices filled with the liquid crystal compositions of the Comparison Examples in the space between the two substrates of the liquid crystal display devices are also listed so that the performances of the liquid crystal composition of the present invention can be compared with those of the Comparison Examples clearly.

Comparison Example 1

The liquid crystal composition of the Comparison Example is prepared according to the formulation listed in Table 2, and is tested by filling the same between two substrates of a liquid crystal display device. The performance data are shown in the Table below:

TABLE 3

The formulation of the liquid crystal composition and its test performance

| Codes of the components | Compound No. | Percent by weight | Test results for the performance parameters | |
|---|---|---|---|---|
| 2CCPOCF3 | | 8 | Δn | 0.1082 |
| 3CCPOCF3 | | 8 | Δε | 11.0 |
| 2CGEPOCF3 | | 4 | V90 | 1.82 |
| 3CCEUF | | 13 | γ1 | 95 |
| 3CPUF | | 8 | $K_{11}$ | 12.3 |
| 2PGUF | | 7 | $K_{33}/K_{11}$ | 0.98 |
| 3PGUF | | 9 | | |
| 3CCV1 | | 12 | | |
| 5CCV | | 18 | | |
| 3CCGUF | | 5 | | |
| 2PUQUF | | 3 | | |
| 3PUQUF | | 5 | | |
| Total | | 100 | | |

Example 1

The liquid crystal composition of the invention is prepared according to the formulation listed in Table 3, and is tested by filling the same between two substrates of a liquid crystal display device. The performance data are shown in the Table below:

TABLE 3

The formulation of the liquid crystal composition and its test performance

| Codes of the components | Compound No. | Percent by weight | Test results for the performance parameters | |
|---|---|---|---|---|
| 3CCEC3 | IV-3-3 | 3 | Δn | 0.100 |
| 3CPP2 | IV-15-3 | 4 | Δε | 10.96 |
| 2CCGF | IV-11-2 | 10 | Cp | 93 |
| 3CCGF | IV-11-3 | 18 | V90 | 1.71 |
| 2CCPOCF3 | II-1-2 | 12 | V10 | 2.33 |
| 3CCPOCF3 | II-1-3 | 13 | V10/V90 | 1.37 |
| 3CCV | III-1-3 | 7 | γ1 | 90 |
| 3CCV1 | III-2-3 | 7 | $K_{11}$(20° C.) | 12.7 |
| 2IUQUF | I-2-2 | 8 | $K_{33}$(20° C.) | 14.5 |
| 3IUQUF | I-2-3 | 8 | t-30° C. | >500 h |
| 3IGUQUF | I-4-3 | 5 | | |
| 2IGUQUF | I-4-2 | 5 | | |
| Total | | 100 | | |

As compared with the Comparison Example, this liquid crystal composition has a suitable dielectric anisotropy and refractivity anisotropy, a high clearing point, a low threshold voltage and a large elastic constant with the advantages of a preferable display contrast, a high response speed and a lower power consumption for a liquid crystal composition, which is adapted for use in low-temperature environment.

Example 2

The liquid crystal composition of the invention is prepared according to the formulation listed in Table 4, and is tested by filling the same between two substrates of a liquid crystal display device. The performance test data are shown in the Table below:

TABLE 4

The formulation of the liquid crystal composition and its test performance

| Codes of the components | Compound No. | Percent by weight | Test results for the performance parameters | |
|---|---|---|---|---|
| 3CPP2 | IV-15-3 | 5 | Δn | 0.109 |
| 2CCGF | IV-11-2 | 7 | Δε | 10.83 |
| 3CCGF | IV-11-3 | 15 | Cp | 95 |
| 2CCPOCF3 | II-1-2 | 10 | V90 | 1.74 |
| 3CCPOCF3 | II-1-3 | 12 | V10 | 2.37 |
| 3CCV | III-1-3 | 10 | V10/V90 | 1.36 |
| 2IUQUF | I-2-2 | 8 | γ1 | 83 |
| 3IUQUF | I-2-3 | 8 | $K_{11}$(20° C.) | 11.8 |
| 3IGUQUF | I-4-3 | 5 | $K_{33}$(20° C.) | 14.4 |
| 2IGUQUF | I-4-2 | 5 | t-30° C. | >500 h |
| 3CCEP3 | IV-17-3 | 3 | | |
| 2CPPF | IV-12-2 | 3 | | |
| 3CPPF | IV-12-3 | 3 | | |
| 4CCGF | IV-11-4 | 3 | | |
| 4CCPOCF3 | II-1-4 | 3 | | |
| Total | | 100 | | |

As compared with the Comparison Example, this liquid crystal composition has a suitable dielectric anisotropy and refractivity anisotropy, a high clearing point, a low threshold voltage and rotary viscosity, and a high elastic constant with the advantages of a preferable display contrast and a high response speed for a liquid crystal composition, which is applicable to outdoor equipments and is adapted for use in low-temperature environment.

Comparison Example

CN1869792

The liquid crystal composition of the Comparison Example is prepared according to the formulation listed in Table 5 and is tested by filling the same between two substrates of a liquid crystal display device. The performance test data is shown in the Table below:

TABLE 5

The formula of the liquid crystal composition and its test performance

| Codes of the components | Compound No. | Percent by weight | Test results for the performance parameters | |
|---|---|---|---|---|
| 2PGUF | | 3.5 | Δn | 0.097 |
| 3PGUF | | 7 | Cp | 75 |
| 2CCEUF | | 3 | V90 | 2.01 |
| 3CCEUF | | 11 | V10 | 2.73 |
| 3CCV1 | | 13 | V10/V90 | 1.36 |
| 5CCV | | 16 | γ1 | 73 |
| VCCP1 | | 2.5 | $K_{11}$ | 12.9 |
| V2CCP1 | | 4 | $K_{33}$ | 12.6 |
| 2CCPOCF3 | | 6 | | |
| 3CCPOCF3 | | 6 | | |
| 4CCPOCF3 | | 6 | | |
| 2PUQUF | | 7 | | |
| 3PUQUF | | 7 | | |
| 3CPO2 | | 8 | | |
| Total | | 100 | | |

Example 3

The liquid crystal composition of the invention is prepared according to the formulation listed in Table 6, and is tested by filling the same between two substrates of a liquid crystal display device. The performance test data are shown in the Table below:

TABLE 6

The formulation of the liquid crystal composition and its test performance

| Codes of the components | Compound No. | Percent by weight | Test results for the performance parameters | |
|---|---|---|---|---|
| 3CPP2 | IV-15-3 | 6 | Δn | 0.100 |
| 2CPGF | IV-13-2 | 5 | Δε | 8.92 |
| 2CCGF | IV-11-2 | 10 | Cp | 88 |
| 3CCGF | IV-11-3 | 18 | V90 | 1.77 |
| 2CCPOCF3 | II-1-2 | 10 | V10 | 2.44 |
| 3CCPOCF3 | II-1-3 | 12 | V10/V90 | 1.38 |
| 3CCV | III-1-3 | 19 | γ1 | 58 |
| 2IUQUF | I-2-2 | 5 | t-30 | >500 h |
| 3IUQUF | I-2-3 | 5 | | |
| 3IGUQUF | I-4-3 | 5 | | |
| 2IGUQUF | I-4-2 | 5 | | |
| Total | | 100 | | |

As compared with the Comparison Examples, this liquid crystal composition has a suitable refractivity anisotropy, a higher clearing point, a low rotary viscosity and threshold voltage with the advantages of a very high response speed and superior power saving performance for a liquid crystal composition, which is adapted for use in low-temperature environment.

Example 4

The liquid crystal composition of the invention is prepared according to the formulation listed in Table 7, and is tested by filling the same between two substrates of a liquid crystal display device. The performance test data are shown in the Table below:

TABLE 7

The formulation of the liquid crystal composition and its test performance

| Codes of the components | Compound No. | Percent by weight | Test results for the performance parameters | |
|---|---|---|---|---|
| 3CPP2 | IV-15-3 | 2 | Δn | 0.103 |
| 2CCPOCF3 | II-1-2 | 10 | Δε | 9.39 |
| 3CCPOCF3 | II-1-3 | 10 | Cp | 87 |
| 3CCV | III-1-3 | 30 | V90 | 1.77 |
| 2IUQUF | I-2-2 | 6 | V10 | 2.40 |
| 3IUQUF | I-2-3 | 6 | V10/V90 | 1.36 |
| 3IGUQUF | I-4-3 | 8 | t-30° C. | >500 h |
| 2IGUQUF | I-4-2 | 10 | | |
| 3CEPC3 | IV-9-3 | 4 | | |
| 4CCPOCF3 | II-1-4 | 10 | | |
| VCCP1 | IV-18-1 | 4 | | |
| Total | | 100 | | |

As compared with the Comparison Examples, this liquid crystal composition has a suitable refractivity anisotropy and a lower threshold voltage with the advantages of a higher clearing point and a higher response speed for a liquid crystal composition, which is adapted for use in low-temperature environment.

Example 5

The liquid crystal composition of the invention is prepared according to the formulation listed in Table 8, and is tested by filling the same between two substrates of a liquid crystal display device. The performance test data are shown in the Table below:

TABLE 8

The formulation of the liquid crystal composition and its test performance

| Codes of the components | Compound No. | byPercent by weight | Test results for the performance parameters | |
|---|---|---|---|---|
| 3CPP2 | IV-15-3 | 4 | Δn | 0.098 |
| 2CCGF | IV-11-2 | 10 | Δε | 10.34 |
| 3CCGF | IV-11-3 | 22 | Cp | 90 |
| 2CCPOCF3 | II-1-2 | 12 | V90 | 1.61 |
| 3CCPOCF3 | II-1-3 | 16 | V10 | 2.22 |
| 3CCV | III-1-3 | 7 | V10/V90 | 1.38 |
| 2IUQUF | I-2-2 | 10 | t-30° C. | >500 h |
| 3IUQUF | I-2-3 | 16 | | |
| 3CCEPC3 | IV-6-3 | 3 | | |
| Total | | 100 | | |

As compared with the comparison examples, this liquid crystal composition has a suitable refractivity anisotropy and a lower threshold voltage with the advantages of a high clearing point and a higher response speed for a liquid crystal composition, which is adapted for use in low-temperature environment.

Example 6

The liquid crystal composition of the invention is prepared according to the formulation listed in Table 9, and is tested by filling the same between two substrates of a liquid crystal display device. The performance test data are shown in the Table below:

TABLE 9

The formulation of the liquid crystal composition and its test performance

| Codes of the components | Compound No. | Percent by weight | Test results for the performance parameters | |
|---|---|---|---|---|
| 3CPP2 | IV-15-3 | 7 | Δn | 0.104 |
| 2CCGF | IV-11-2 | 10 | Δε | 10.47 |
| 3CCGF | IV-11-3 | 14 | Cp | 86 |
| 2CCPOCF3 | II-1-2 | 12 | V90 | 1.69 |
| 3CCPOCF3 | II-1-3 | 12 | V10 | 2.34 |
| 3CCV | III-1-3 | 16 | V10/V90 | 1.39 |
| 2IUQUF | I-2-2 | 8 | t-30° C. | >500 h |
| 3IUQUF | I-2-3 | 8 | | |
| 3IGUQUF | I-4-3 | 5 | | |
| 2IGUQUF | I-4-2 | 5 | | |
| 3CPGF | IV-13-3 | 3 | | |
| Total | | 100 | | |

As compared with the Comparison Examples, this liquid crystal composition has a suitable refractivity anisotropy and a lower threshold voltage with the advantages of a higher clearing point and a higher response speed for a liquid crystal composition, which is being adapted for use in low-temperature environment.

What is claimed is:
1. A liquid crystal composition, comprising:
   (1) 1%-50% by weight of the total amount of the liquid crystal composition of a compound of general formula (I)

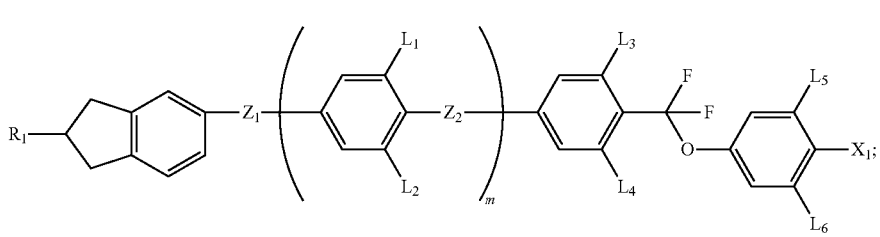

(2) 1%-60% by weight of the total amount of the liquid crystal composition of a compound of general formula (II)

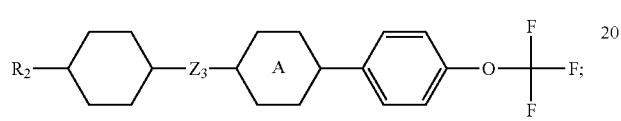

(3) 1%-60% by weight of the total amount of the liquid crystal composition of a compound of general formula (III)

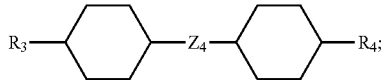

and (4) 0%-50% by weight of the total amount of the liquid crystal composition of a compound of general formula (IV)

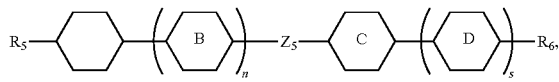

in which:
- $R_1$, $R_2$, $R_3$, $R_4$, $R_5$ and $R_6$ represents same or different substituents, and are independently selected from the group consisting of H, halogen, $C_1$-$C_7$ alkyl, $C_1$-$C_7$ alkoxy, $C_2$-$C_7$ alkenyl and $C_2$-$C_7$ alkenoxy, in which one or more H of the $C_1$-$C_7$ alkyl, $C_1$-$C_7$ alkoxy, $C_2$-$C_7$ alkenyl and $C_2$-$C_7$ alkenoxy can be independently substituted by F;
- $Z_1$-$Z_5$ represents same or different substituents, and are independently selected from the group consisting of single bond, —CH=CH—, —C≡O—, —O—, —COO—, —OCO—, —OCH$_2$—, —C$_2$H$_4$—, —CH$_2$O— and —CF$_2$O—;
- $X_1$ is selected from a group consisting of halogen, $C_1$-$C_7$ alkyl, $C_1$-$C_7$ alkoxy and $C_2$-$C_7$ alkenoxy, in which one or more H of the $C_1$-$C_7$ alkyl, $C_1$-$C_7$ alkoxy and $C_2$-$C_7$ alkenoxy are optionally independently substituted by F;
- $L_1$-$L_6$ represents same or different substituents and independently are H or F, in which, at least two of the $L_1$-$L_6$ are F;

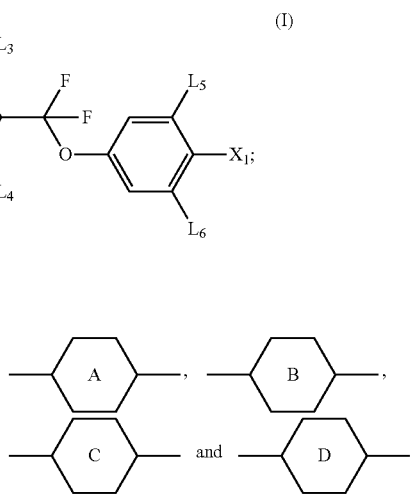

are independently selected from the group consisting of

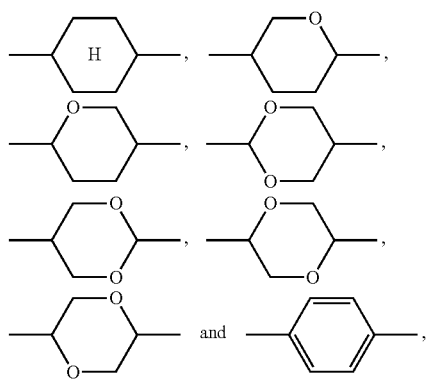

in which, one or more H of the

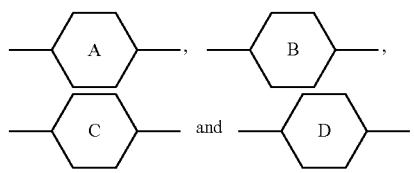

can be independently substituted by F;
m, n and s independently are 0 or 1, and n and s are not simultaneously 0.

2. The liquid crystal composition according to claim 1, wherein the compound of general formula (I) accounts for 3%-45% by weight of the total amount of the liquid crystal composition; the compound of general formula (II) accounts for 2%-50% by weight of the total amount of the liquid crystal composition; the compound of general formula (III) accounts for 3%-45% by weight of the total amount of the liquid crystal composition; and the compound of general formula (IV) accounts for 5%-40% by weight of the total amount of the liquid crystal composition.

3. The liquid crystal composition according to claim 1, wherein the compound of general formula (I) is one or more compounds selected from the group consisting of the following compounds:

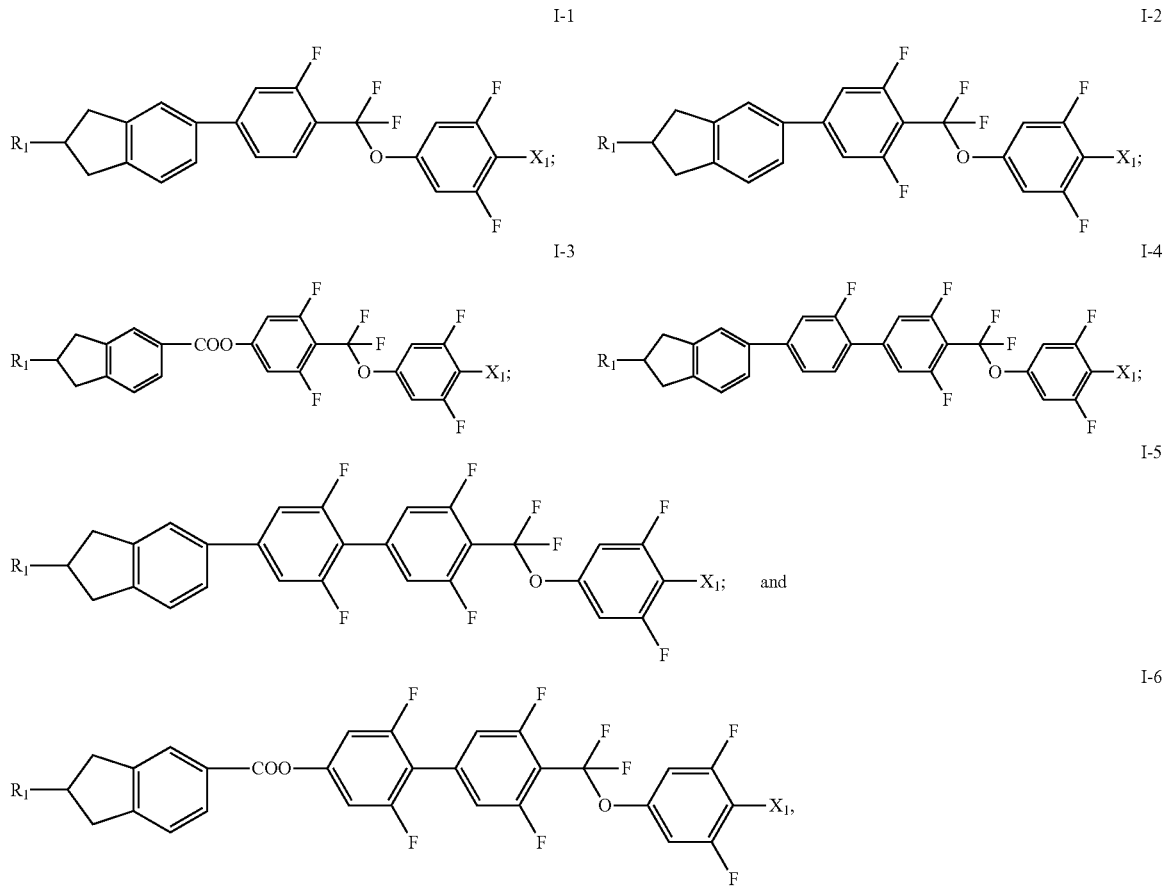

in which,
R₁ is selected from the group consisting of $C_1$-$C_5$ alkyl, $C_1$-$C_5$ alkoxy, $C_2$-$C_5$ alkenyl and $C_2$-$C_5$ alkenoxy, in which one or more H of the $C_1$-$C_5$ alkyl, $C_1$-$C_5$ alkoxy, $C_2$-$C_5$ alkenyl and $C_2$-$C_5$ alkenoxy are optionally independently substituted by F;
X₁ is selected from the group consisting of —F, —Cl, —CH₂F, —CH₂CH₂F, —CH₂CH₂CH₂F, —CH₂CH₂CH₂CH₂F, —OCF₃, —OCH₂F, —CH₂OCH₂F, —CH₂CH₂OCH₂F, —CH=CH₂ and —OCH=CF₂.

4. The liquid crystal composition according to claim 1, wherein the compound of general formula (II) is one or more compounds selected from the group consisting of the following compounds:

II-1
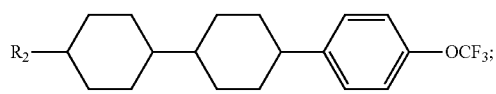

II-2
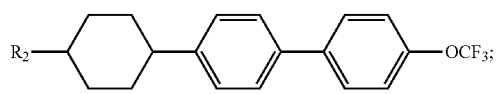

-continued

II-3
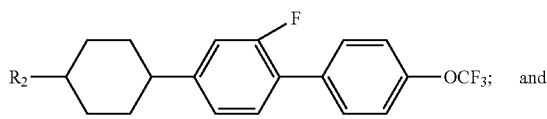
and

II-4
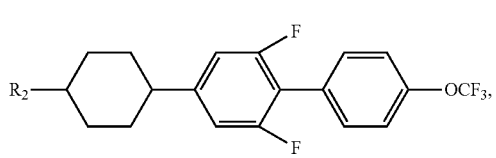

in which,
R₂ is selected from a group consisting of $C_1$-$C_5$ alkyl, $C_1$-$C_5$ alkoxy, $C_2$-$C_5$ alkenyl and $C_2$-$C_5$ alkenoxy, in which one or more H of the $C_1$-$C_5$ alkyl, $C_1$-$C_5$ alkoxy, $C_2$-$C_5$ alkenyl and $C_2$-$C_5$ alkenoxy are optionally independently substituted by F.

5. The liquid crystal composition according to claim 1, wherein the compound of general formula (III) is one or more compounds selected from the group consisting of the following compounds:

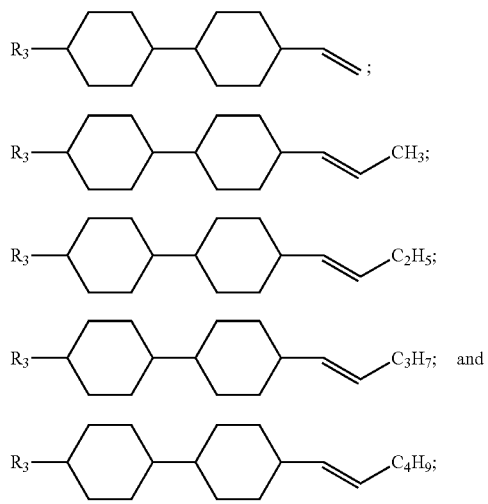

in which, $R_3$ is selected from the group consisting of $C_1$-$C_5$ alkyl, $C_1$-$C_5$ alkoxy, $C_2$-$C_5$ alkenyl and $C_2$-$C_5$ alkenoxy, in which one or more H of the $C_1$-$C_5$ alkyl, $C_1$-$C_5$ alkoxy, $C_2$-$C_5$ alkenyl and $C_2$-$C_5$ alkenoxy are optionally independently substituted by F.

6. The liquid crystal composition according to claim 1, wherein the compound of general formula (IV) is one or more compounds selected from the group consisting of the following compounds:

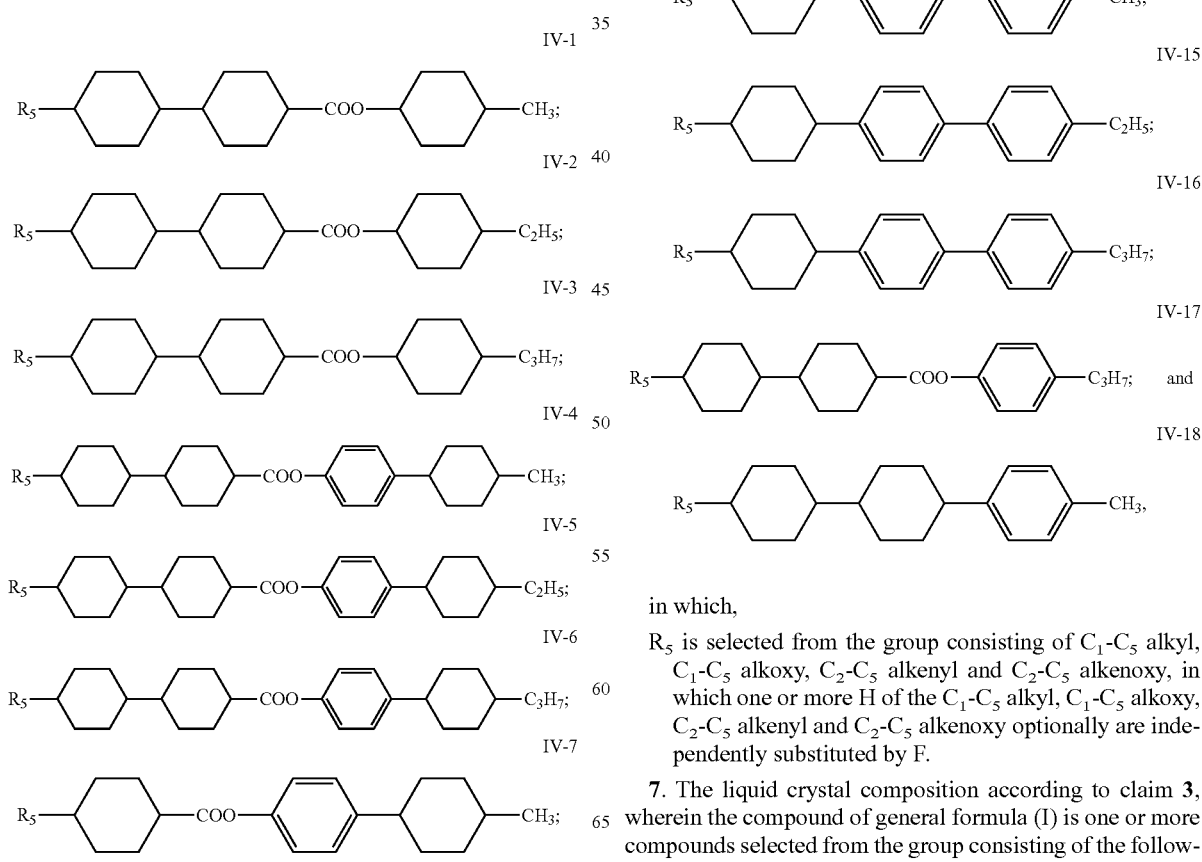

in which, $R_5$ is selected from the group consisting of $C_1$-$C_5$ alkyl, $C_1$-$C_5$ alkoxy, $C_2$-$C_5$ alkenyl and $C_2$-$C_5$ alkenoxy, in which one or more H of the $C_1$-$C_5$ alkyl, $C_1$-$C_5$ alkoxy, $C_2$-$C_5$ alkenyl and $C_2$-$C_5$ alkenoxy optionally are independently substituted by F.

7. The liquid crystal composition according to claim 3, wherein the compound of general formula (I) is one or more compounds selected from the group consisting of the following compounds:

I-1-1
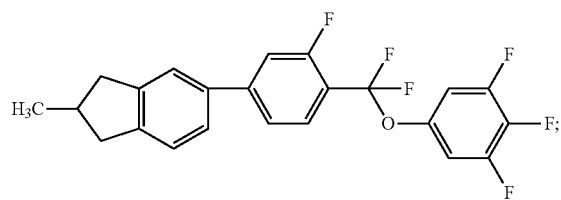
I-1-2
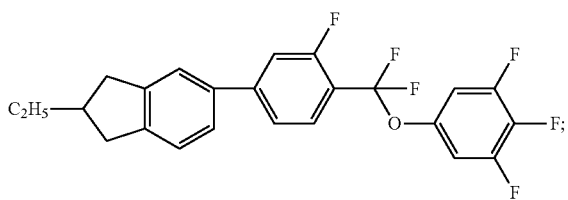
I-1-3
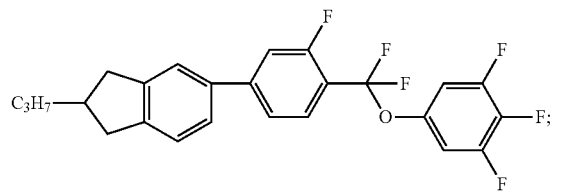
I-1-4
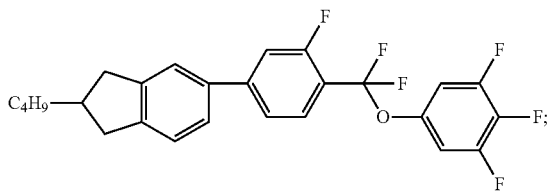
I-1-5
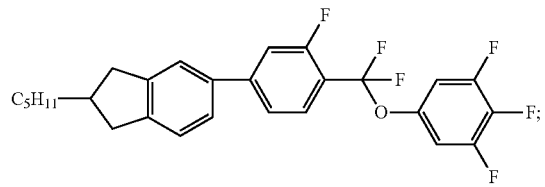
I-1-6
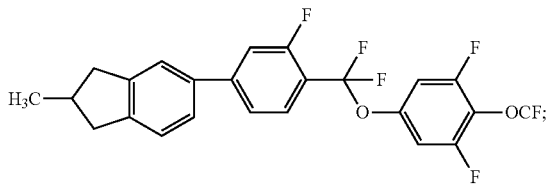
I-1-7
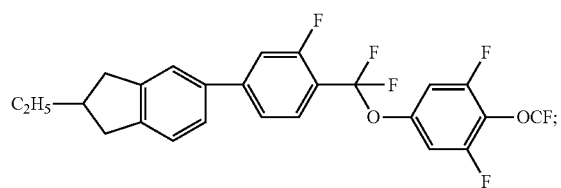
I-1-8
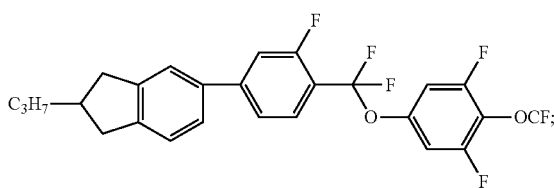
I-1-9
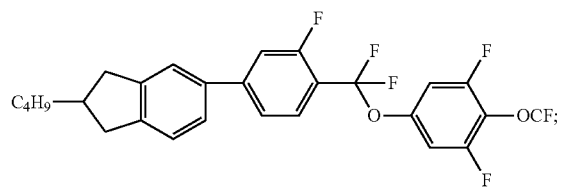
I-1-10
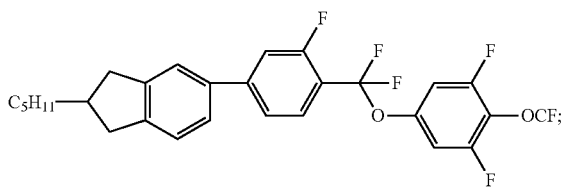
I-1-11
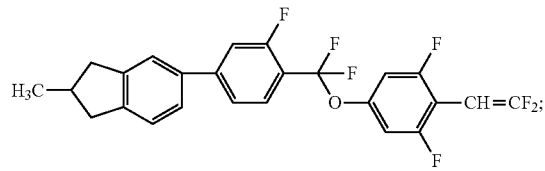
I-1-12
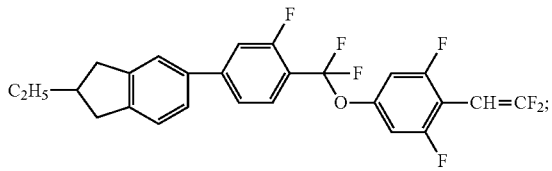
I-1-13
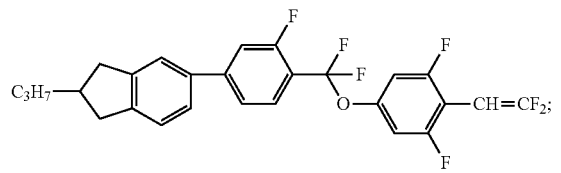
I-1-14
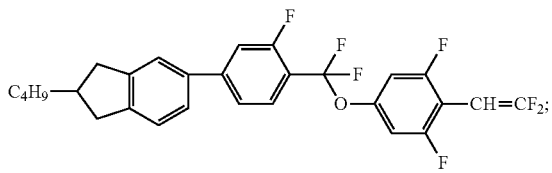

I-1-15
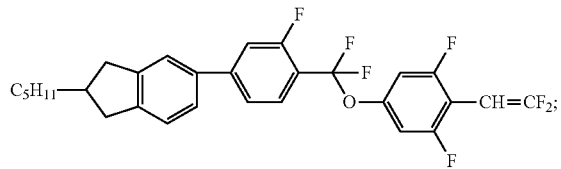
I-2-1
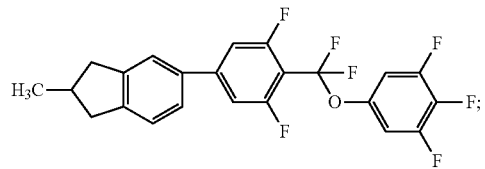
I-2-2
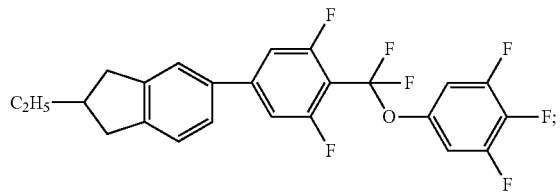
I-2-3
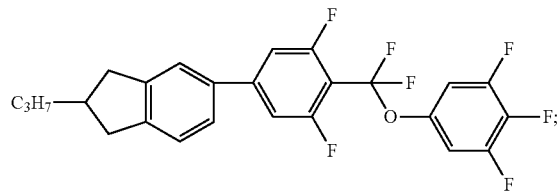
I-2-4
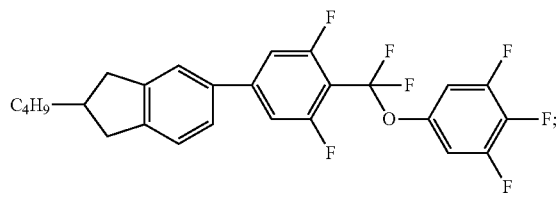
I-2-5
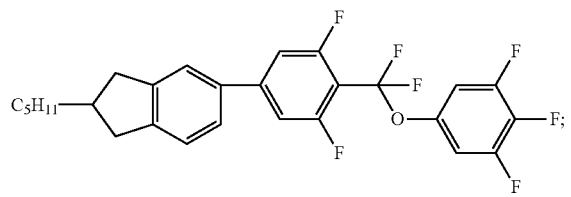
I-2-6
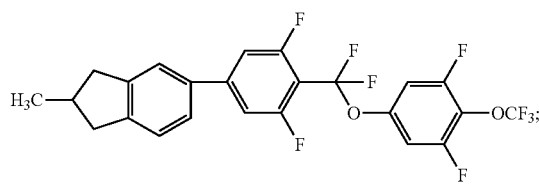
I-2-7
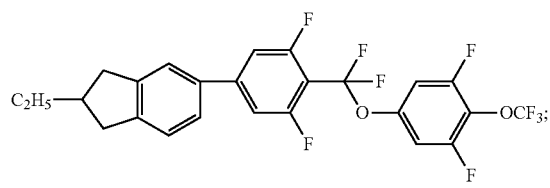
I-2-8
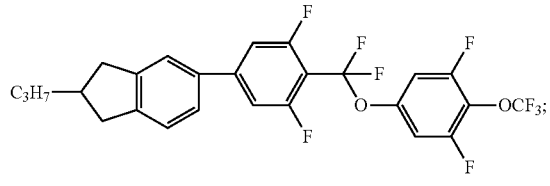
I-2-9
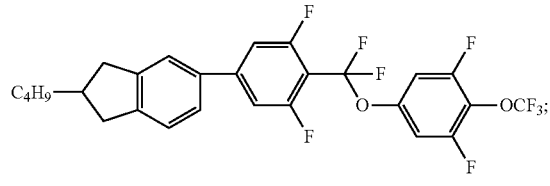
I-2-10
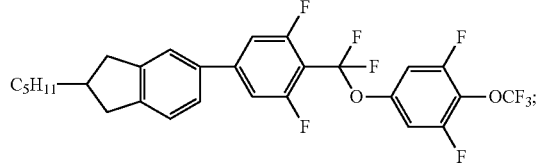
I-2-11
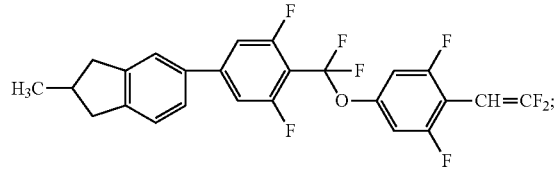
I-2-12
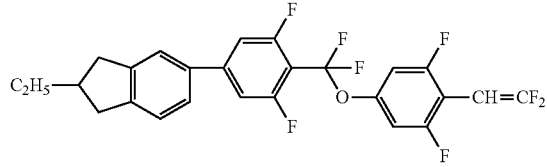
I-2-13
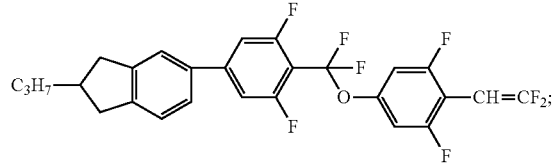

-continued
I-2-14
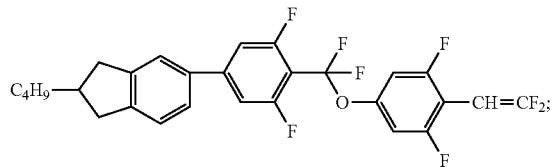
I-2-15
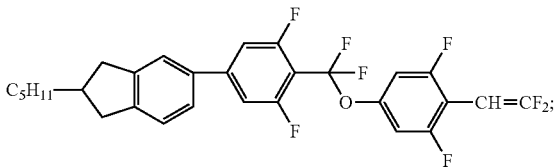
I-3-1
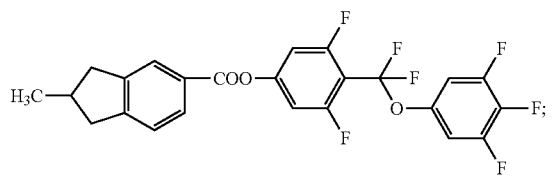
I-3-2
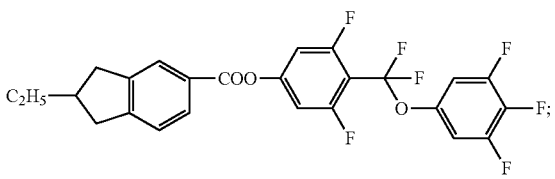
I-3-3
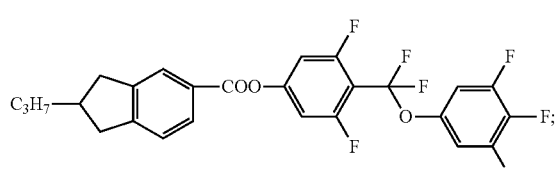
I-3-4
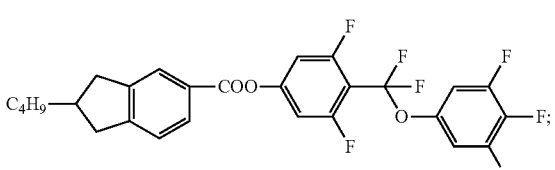
I-3-5
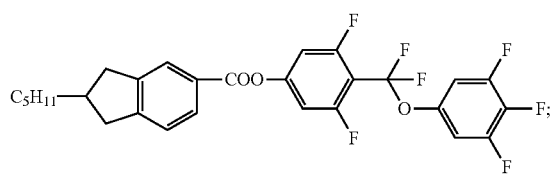
I-3-6
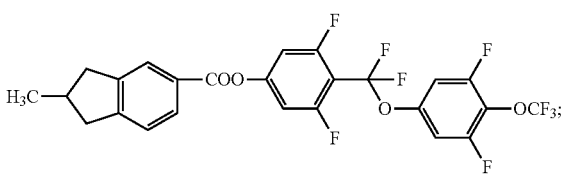
I-3-7
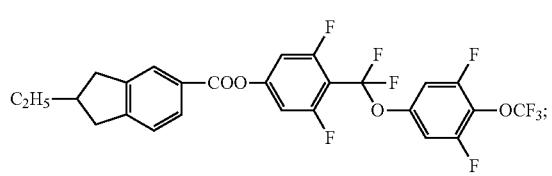
I-3-8
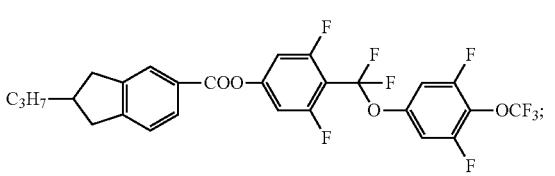
I-3-9
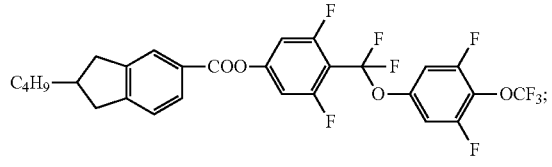
I-3-10
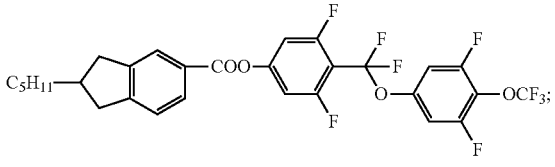
I-3-11
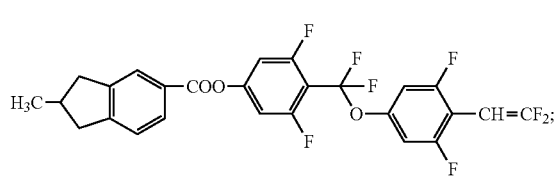
I-3-12
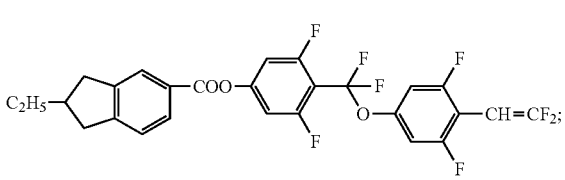
I-3-13
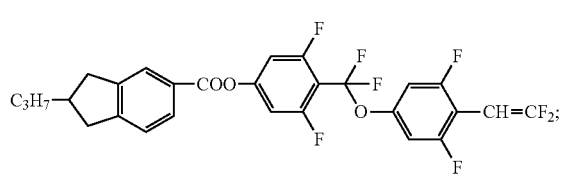
I-3-14
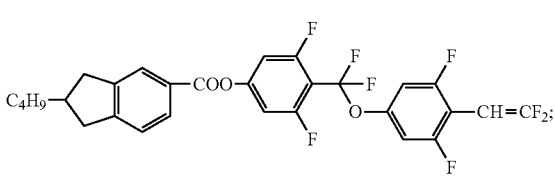

-continued
I-3-15
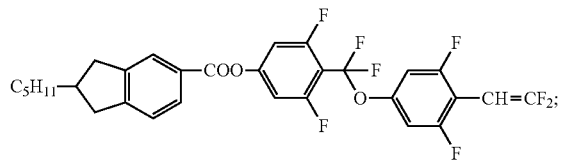
I-4-1
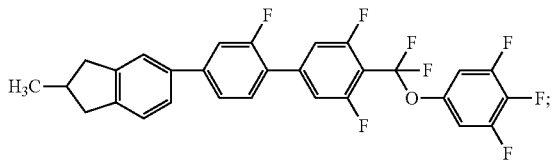
I-4-2
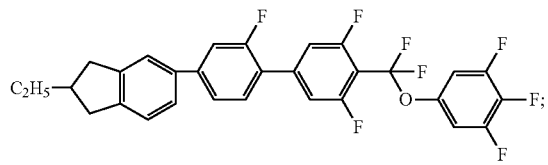
I-4-3
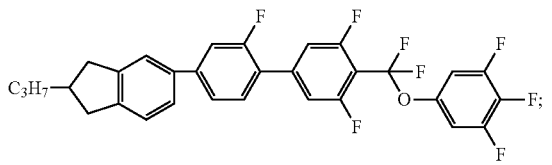
I-4-4
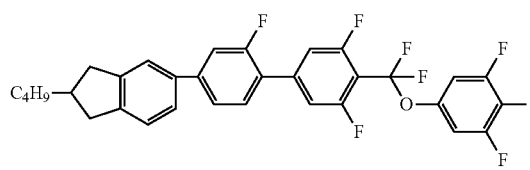
I-4-5
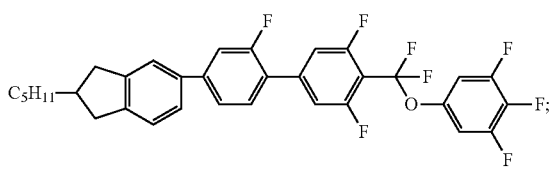
I-4-6
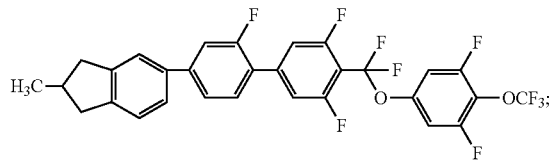
I-4-7
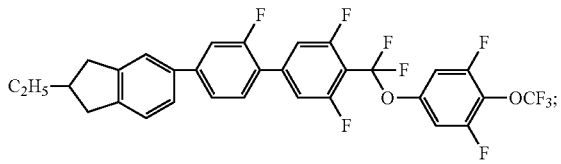
I-4-8
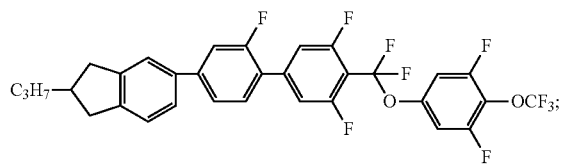
I-4-9
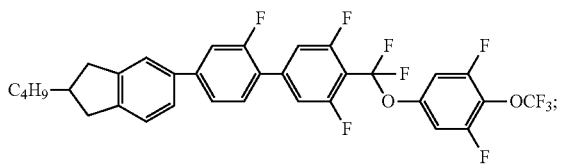
I-4-10
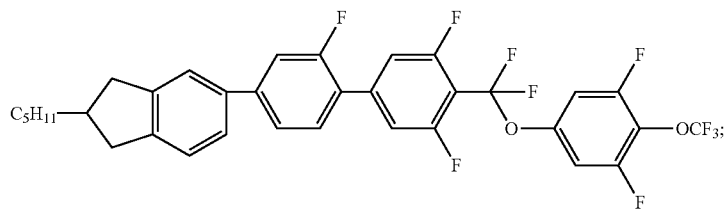
I-4-11
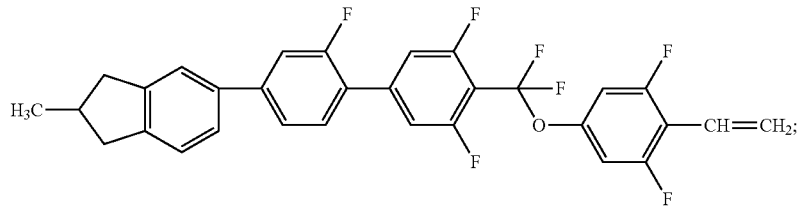
I-4-12
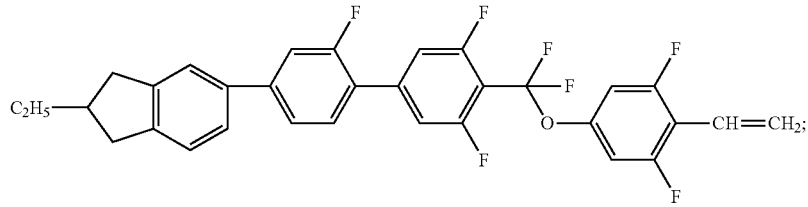

-continued
I-4-13
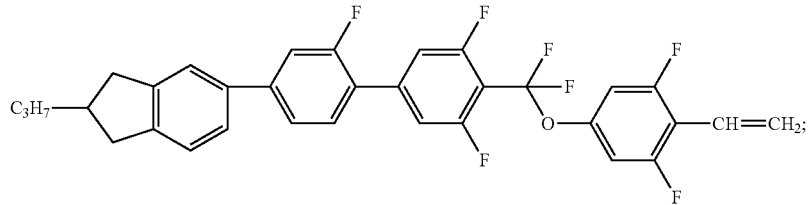
I-4-14
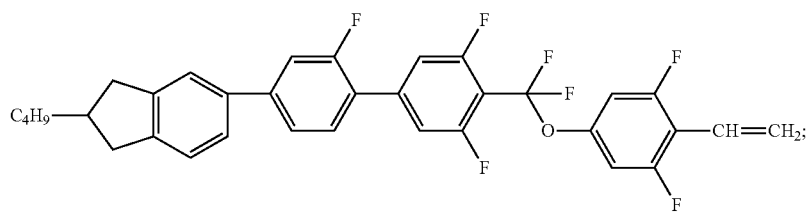
I-4-15
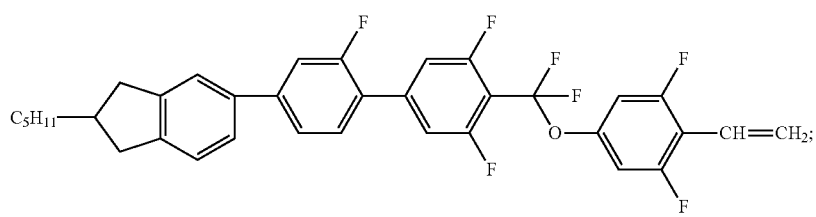
I-5-1
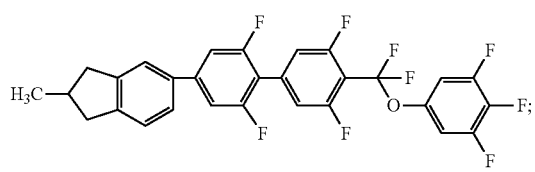
I-5-2
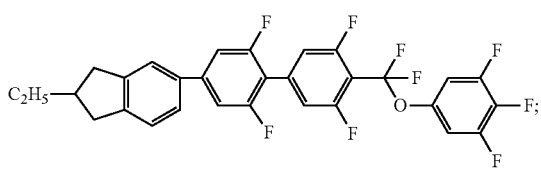
I-5-3
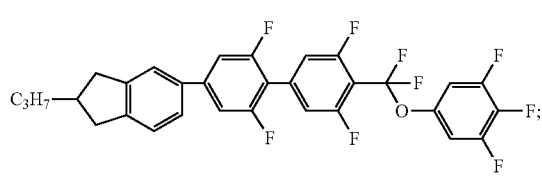
I-5-4
I-5-5
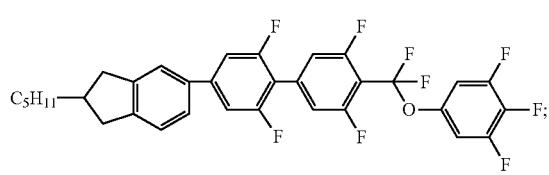
I-5-6
I-5-7
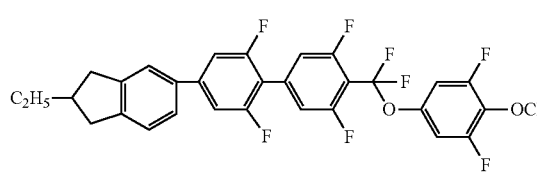
I-5-8
I-5-9
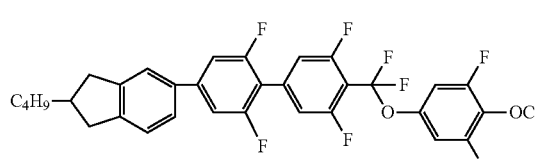
I-5-10
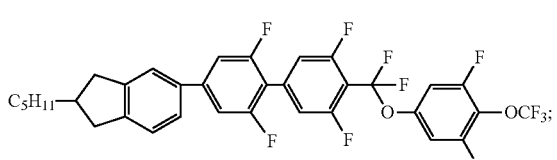

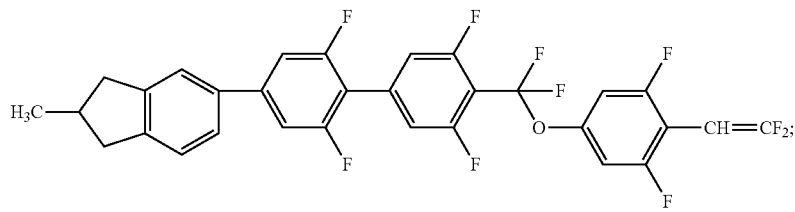
I-5-11
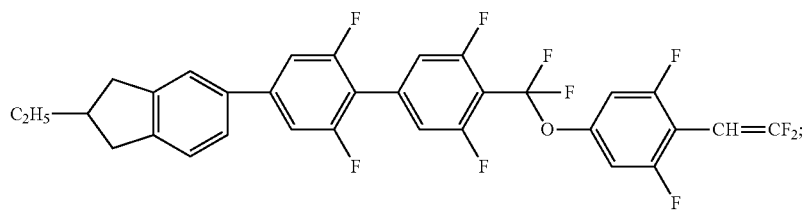
I-5-12
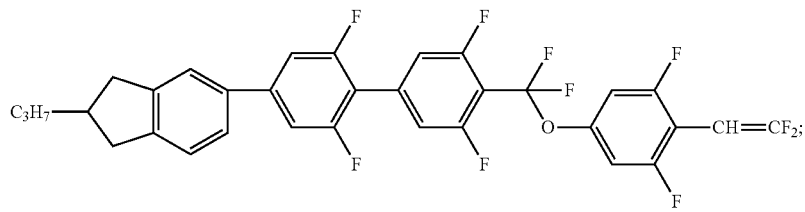
I-5-13
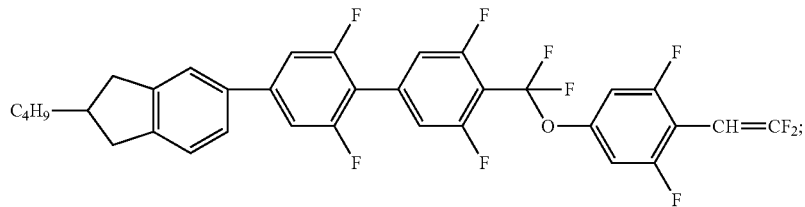
I-5-14
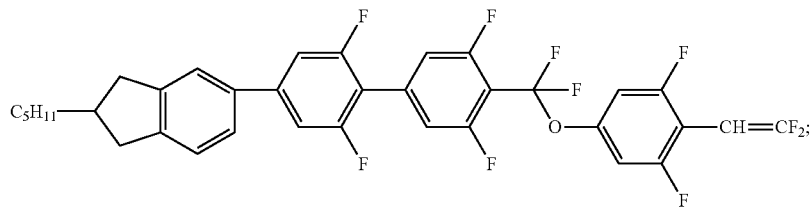
I-5-15
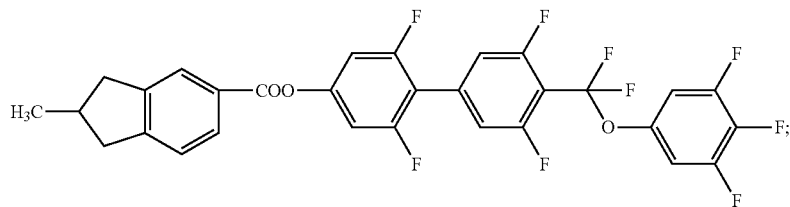
I-6-1
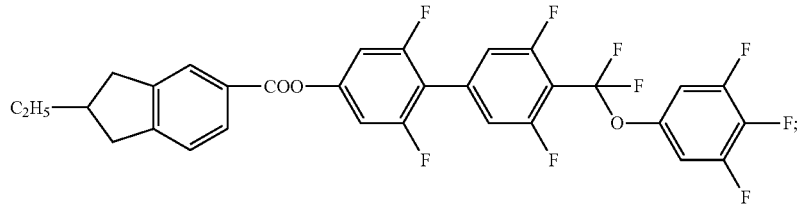
I-6-2

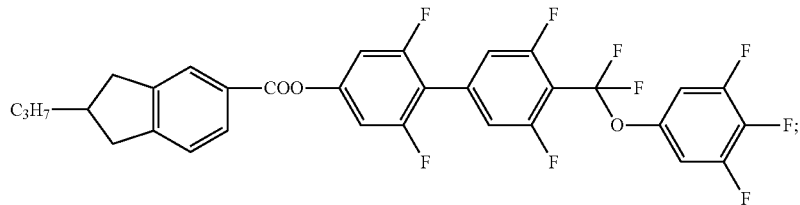
I-6-3
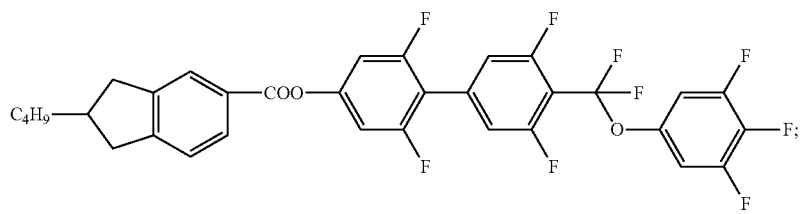
I-6-4
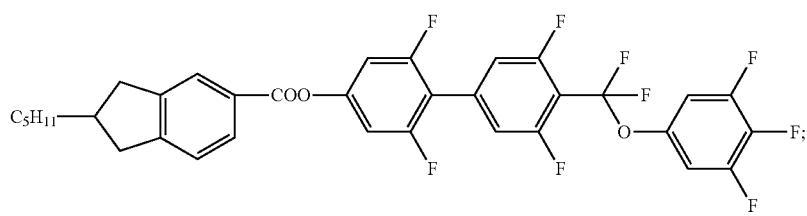
I-6-5
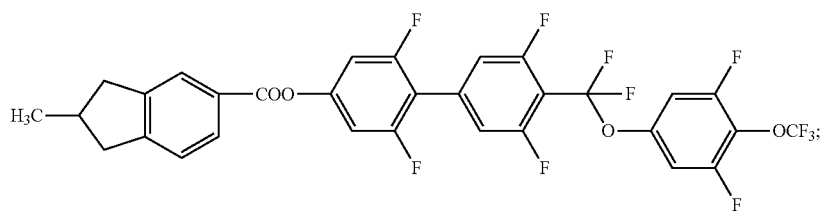
I-6-6
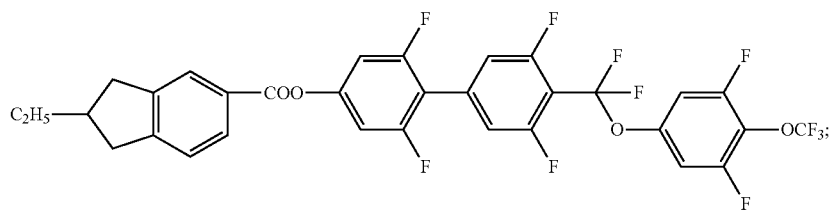
I-6-7
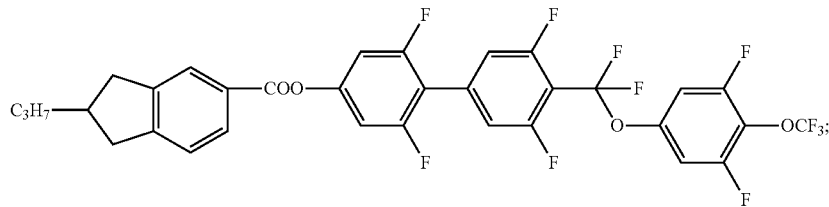
I-6-8
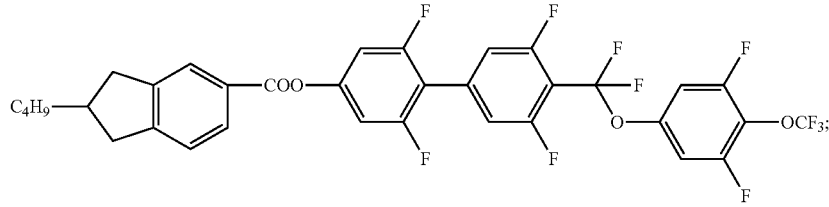
I-6-9

-continued
I-6-10
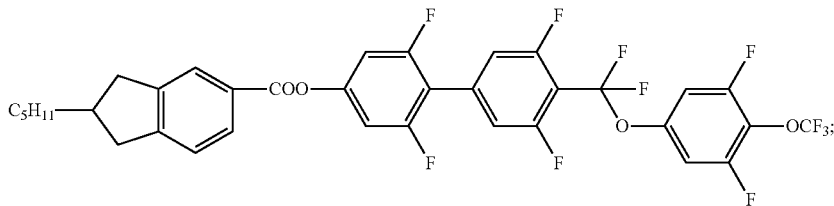
I-6-11
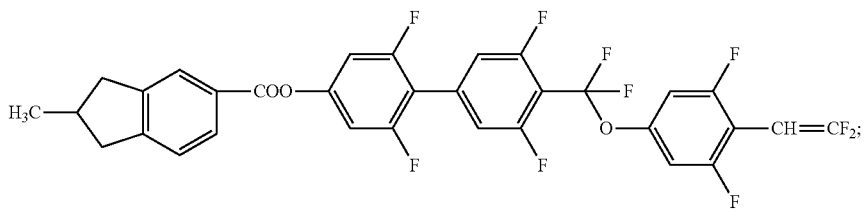
I-6-12
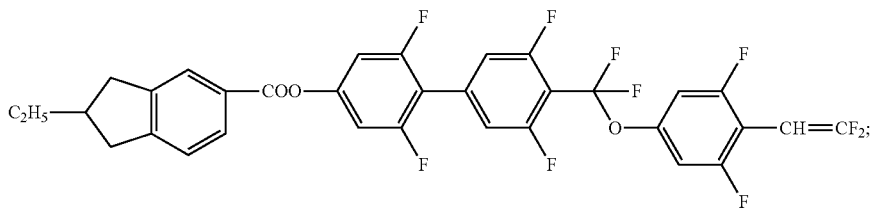
I-6-13
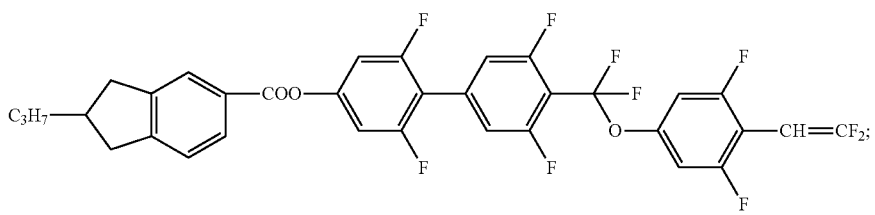
I-6-14
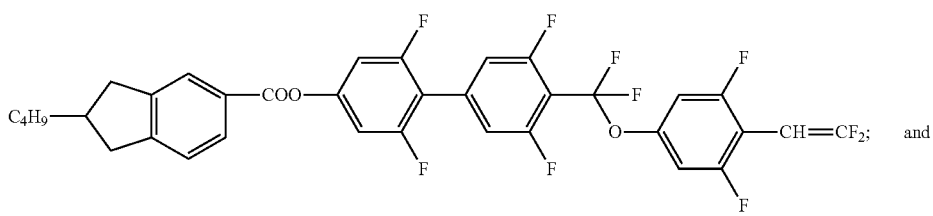
and
I-6-15
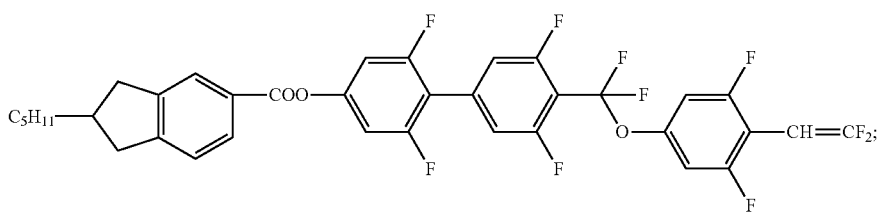
the compound of general formula (II) is one or more compounds selected from the group consisting of the following compounds:
-continued
II-1-2
II-1-1
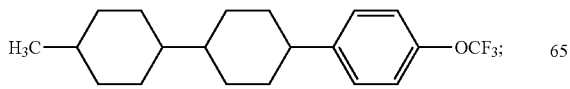
II-1-3

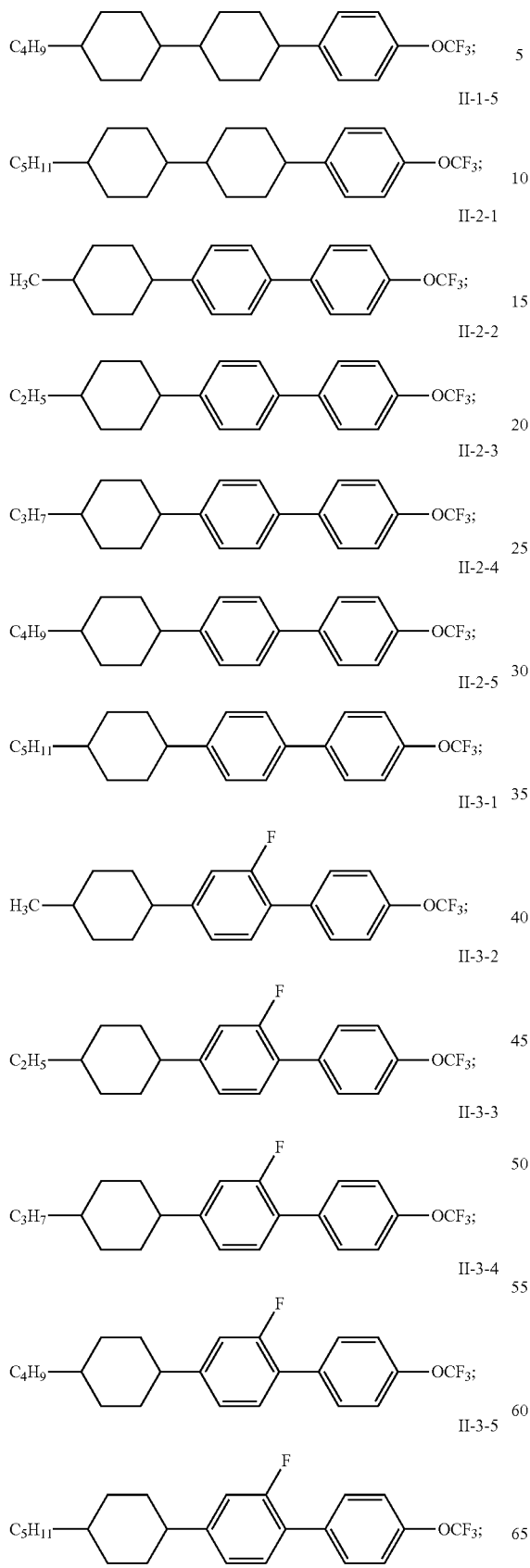
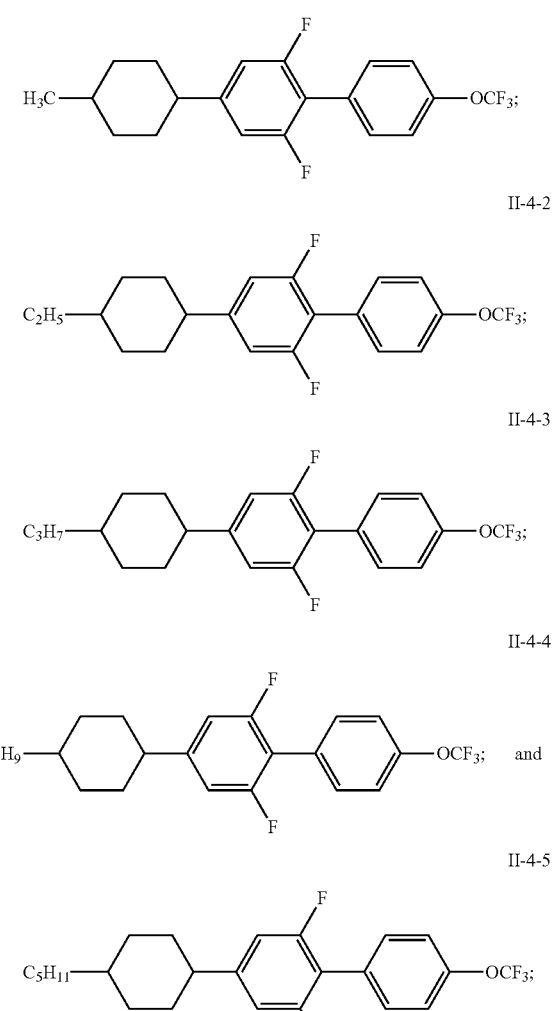
the compound of general formula (III) is one or more compounds selected from the group consisting of the following compounds:
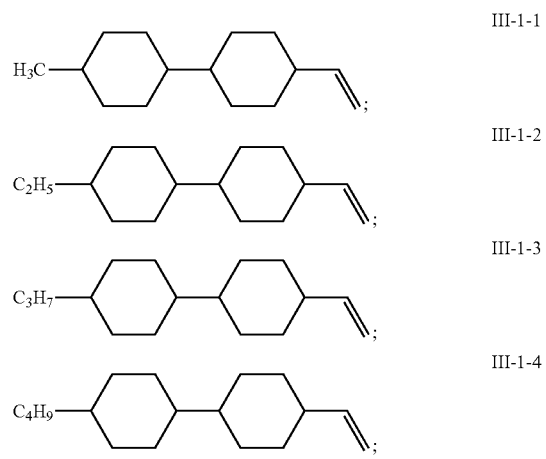

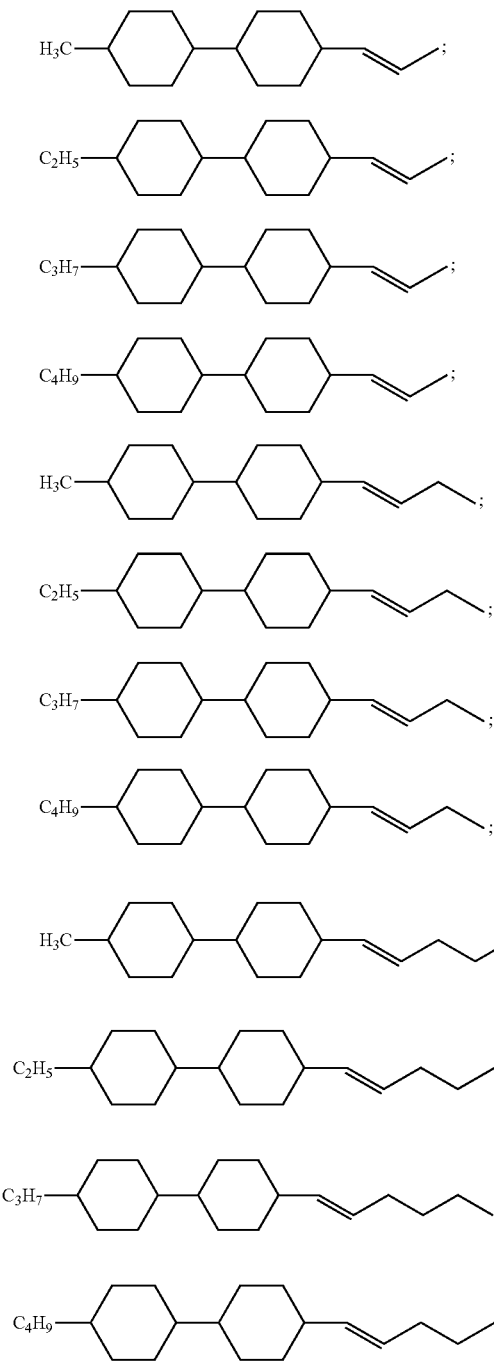
and,
the compound of general formula (IV) is one or more compounds selected from the group consisting of the following compounds:
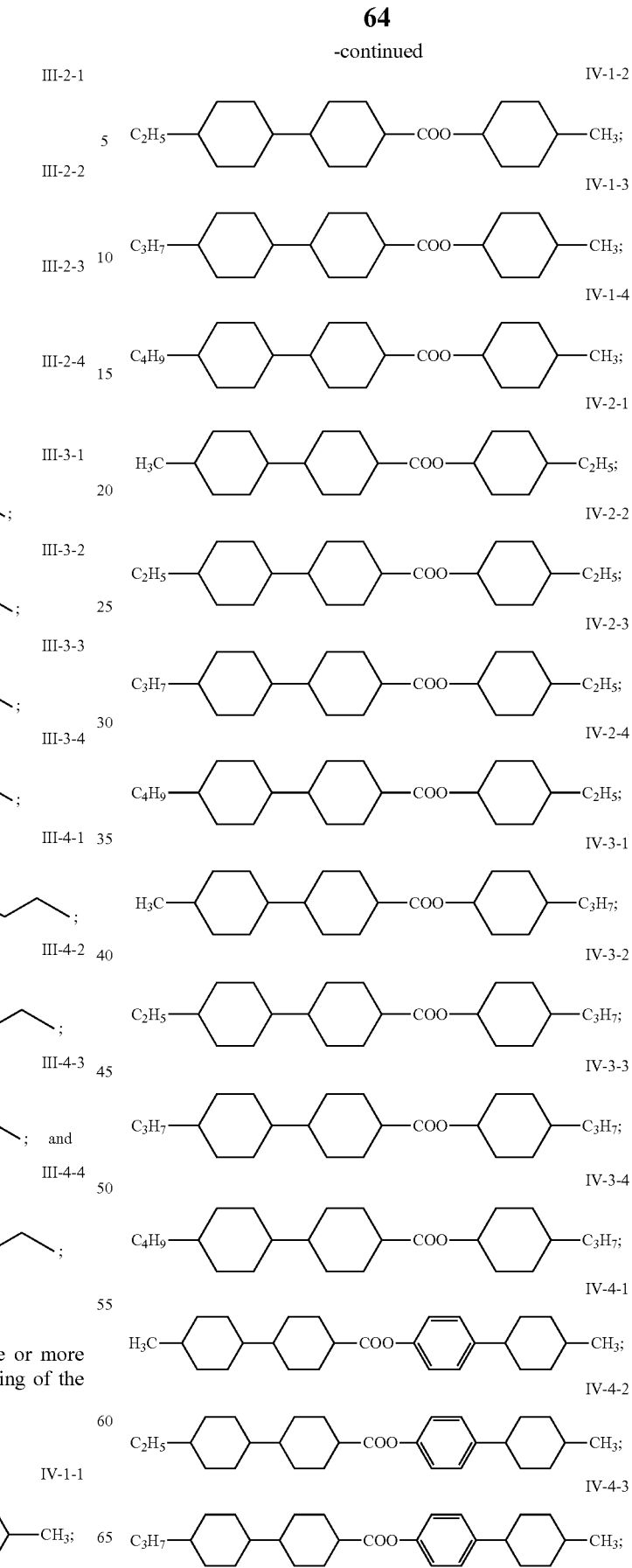

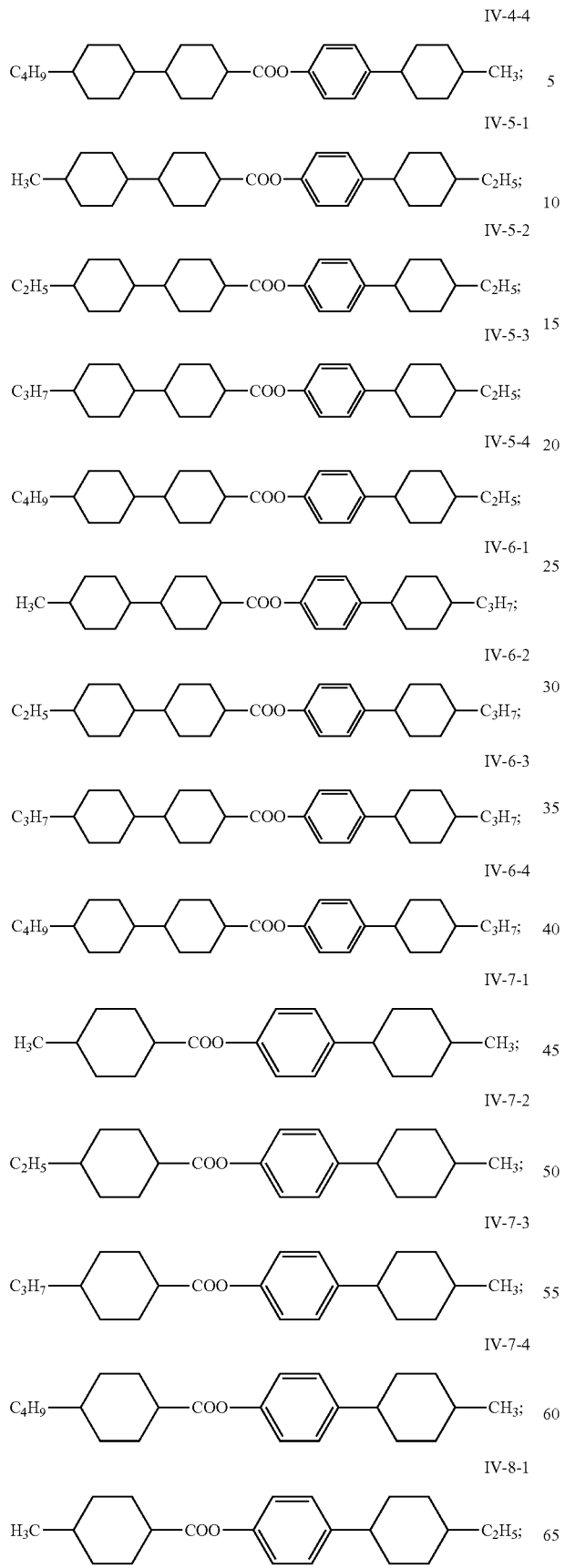
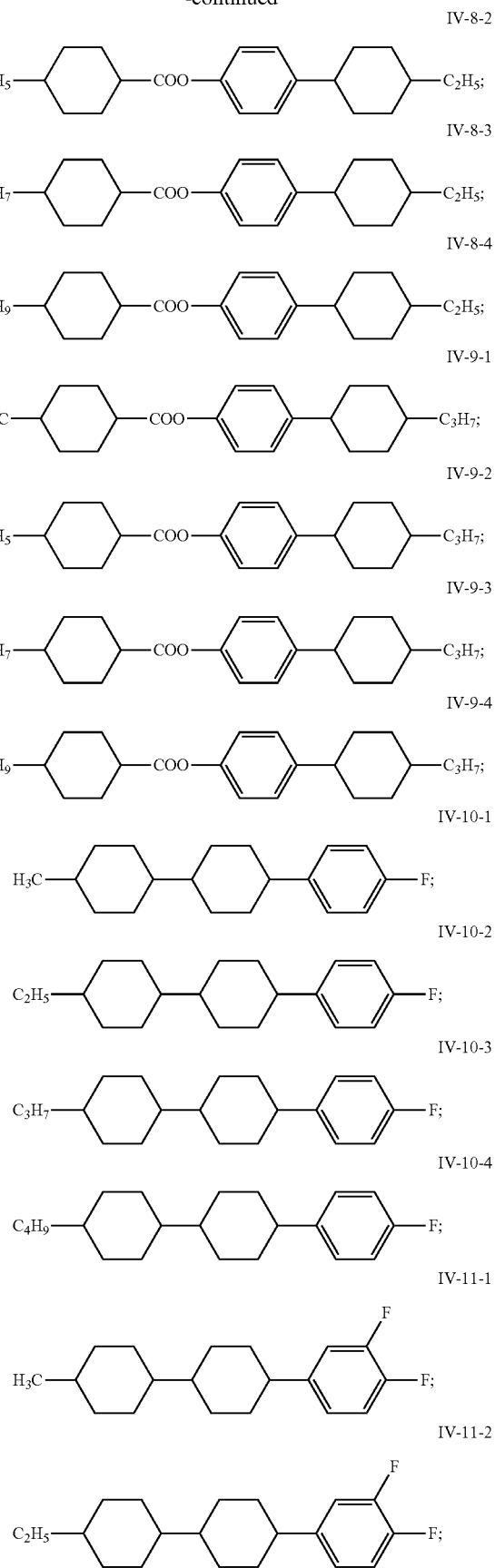

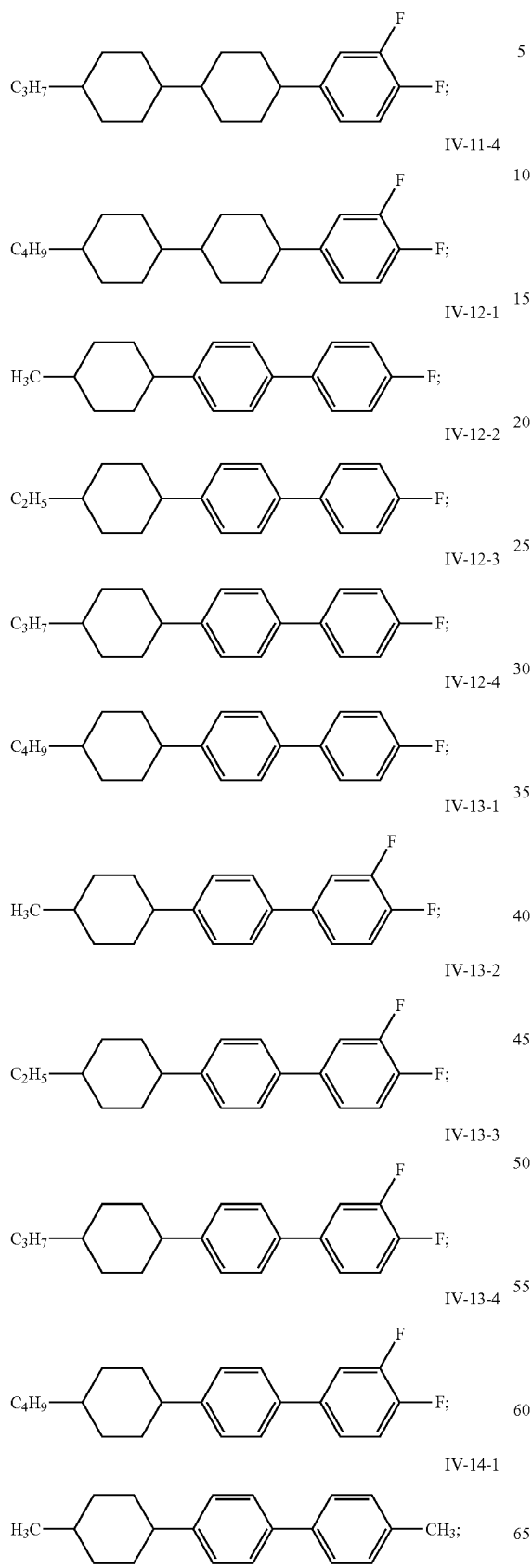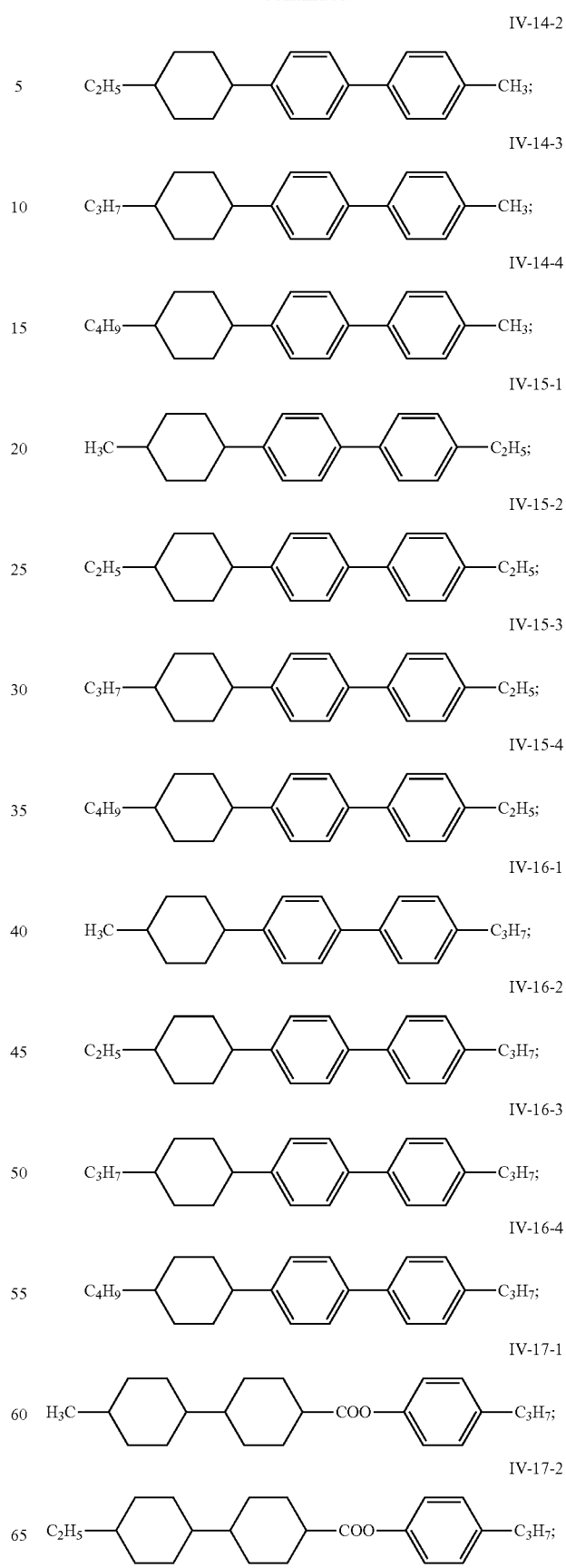

-continued

IV-17-3

C₃H₇—[Cy]—[Cy]—COO—[Ph]—C₃H₇;

IV-17-4

C₄H₉—[Cy]—[Cy]—COO—[Ph]—C₃H₇;

IV-18-1

CH₂=CH—[Cy]—[Cy]—[Ph]—CH₃;

IV-18-2

CH₃CH=CH—[Cy]—[Cy]—[Ph]—CH₃; and

IV-18-3

C₃H₇CH=CH—[Cy]—[Cy]—[Ph]—CH₃.

8. The liquid crystal composition according to claim 7, wherein the liquid crystal composition comprises:

3% by weight of the total amount of the liquid crystal composition of compound IV-3-3;
4% by weight of the total amount of the liquid crystal composition of compound IV-15-3;
10% by weight of the total amount of the liquid crystal composition of compound IV-11-2;
18% by weight of the total amount of the liquid crystal composition of compound IV-11-3;
12% by weight of the total amount of the liquid crystal composition of compound II-1-2;
13% by weight of the total amount of the liquid crystal composition of compound II-1-3;
7% by weight of the total amount of the liquid crystal composition of compound III-1-3;
7% by weight of the total amount of the liquid crystal composition of compound III-2-3;
8% by weight of the total amount of the liquid crystal composition of compound I-2-2;
8% by weight of the total amount of the liquid crystal composition of compound I-2-3;
5% by weight of the total amount of the liquid crystal composition of compound I-4-3; and
5% by weight of the total amount of the liquid crystal composition of compound I-4-2;
or the liquid crystal composition comprises:
5% by weight of the total amount of the liquid crystal composition of compound IV-15-3;
7% by weight of the total amount of the liquid crystal composition of compound IV-11-2;
15% by weight of the total amount of the liquid crystal composition of compound IV-11-3;
10% by weight of the total amount of the liquid crystal composition of compound II-1-2;
12% by weight of the total amount of the liquid crystal composition of compound II-1-3;
10% by weight of the total amount of the liquid crystal composition of compound III-1-3;
8% by weight of the total amount of the liquid crystal composition of compound I-2-2;
8% by weight of the total amount of the liquid crystal composition of compound I-2-3;
5% by weight of the total amount of the liquid crystal composition of compound I-4-3;
5% by weight of the total amount of the liquid crystal composition of compound I-4-2;
3% by weight of the total amount of the liquid crystal composition of compound IV-17-3;
3% by weight of the total amount of the liquid crystal composition of compound IV-12-2;
3% by weight of the total amount of the liquid crystal composition of compound IV-12-3;
3% by weight of the total amount of the liquid crystal composition of compound IV-11-4; and
3% by weight of the total amount of the liquid crystal composition of compound II-1-4;
or the liquid crystal composition comprises:
6% by weight of the total amount of the liquid crystal composition of compound IV-15-3;
5% by weight of the total amount of the liquid crystal composition of compound IV-13-2;
10% by weight of the total amount of the liquid crystal composition of compound IV-11-2;
18% by weight of the total amount of the liquid crystal composition of compound IV-11-3;
10% by weight of the total amount of the liquid crystal composition of compound II-1-2;
12% by weight of the total amount of the liquid crystal composition of compound II-1-3;
19% by weight of the total amount of the liquid crystal composition of compound III-1-3;
5% by weight of the total amount of the liquid crystal composition of compound I-2-2;
5% by weight of the total amount of the liquid crystal composition of compound I-2-3;
5% by weight of the total amount of the liquid crystal composition of compound I-4-3; and
5% by weight of the total amount of the liquid crystal composition of compound I-4-2;
or the liquid crystal composition comprises:
2% by weight of the total amount of the liquid crystal composition of compound IV-15-3;
10% by weight of the total amount of the liquid crystal composition of compound II-1-2;
10% by weight of the total amount of the liquid crystal composition of compound II-1-3;
30% by weight of the total amount of the liquid crystal composition of compound III-1-3;
6% by weight of the total amount of the liquid crystal composition of compound I-2-2;
6% by weight of the total amount of the liquid crystal composition of compound I-2-3;
8% by weight of the total amount of the liquid crystal composition of compound I-4-3;
10% by weight of the total amount of the liquid crystal composition of compound I-4-2;
4% by weight of the total amount of the liquid crystal composition of compound IV-9-3;
10% by weight of the total amount of the liquid crystal composition of compound II-1-4; and
4% by weight of the total amount of the liquid crystal composition of compound IV-18-1,
or the liquid crystal composition comprises:
4% by weight of the total amount of the liquid crystal composition of compound IV-15-3;
10% by weight of the total amount of the liquid crystal composition of compound IV-11-2;

22% by weight of the total amount of the liquid crystal composition of compound IV-11-3;
12% by weight of the total amount of the liquid crystal composition of compound II-1-2;
16% by weight of the total amount of the liquid crystal composition of compound II-1-3;
7% by weight of the total amount of the liquid crystal composition of compound III-1-3;
10% by weight of the total amount of the liquid crystal composition of compound I-2-2;
16% by weight of the total amount of the liquid crystal composition of compound I-2-3; and
3% by weight of the total amount of the liquid crystal composition of compound IV-6-3;
or the liquid crystal composition comprises:
7% by weight of the total amount of the liquid crystal composition of compound IV-15-3;
10% by weight of the total amount of the liquid crystal composition of compound IV-11-2,
14% by weight of the total amount of the liquid crystal composition of compound IV-11-3;
12% by weight of the total amount of the liquid crystal composition of compound II-1-2;
12% by weight of the total amount of the liquid crystal composition of compound II-1-3;
16% by weight of the total amount of the liquid crystal composition of compound III-1-3;
8% by weight of the total amount of the liquid crystal composition of compound I-2-2;
8% by weight of the total amount of the liquid crystal composition of compound I-2-3;
5% by weight of the total amount of the liquid crystal composition of compound I-4-3;
5% by weight of the total amount of the liquid crystal composition of compound I-4-2; and
3% by weight of the total amount of the liquid crystal composition of compound IV-13-3.

9. A method of forming an electrooptic device, said method comprising the steps of:
providing a liquid crystal composition according to claim 1;
manufacturing an electrooptic device using the liquid crystal composition.

10. An electrooptic liquid crystal display comprising the liquid crystal composition of claim 1.

* * * * *